(12) United States Patent
Kim et al.

(10) Patent No.: US 11,573,655 B2
(45) Date of Patent: Feb. 7, 2023

(54) DISPLAY DEVICE INCLUDING TOUCH SENSOR

(71) Applicant: Samsung Display Co., Ltd., Yongin-si (KR)

(72) Inventors: Jang Hui Kim, Suwon-si (KR); Ga Young Kim, Hwaseong-si (KR); Jung Mok Park, Hwaseong-si (KR); A Ra Jo, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/248,878

(22) Filed: Feb. 11, 2021

(65) Prior Publication Data

US 2021/0263630 A1 Aug. 26, 2021

(30) Foreign Application Priority Data

Feb. 20, 2020 (KR) ........................ 10-2020-0020789

(51) Int. Cl.
*G06F 3/041* (2006.01)

(52) U.S. Cl.
CPC ...... *G06F 3/04142* (2019.05); *G06F 3/04146* (2019.05); *G06F 2203/04105* (2013.01)

(58) Field of Classification Search
CPC ............. G06F 3/04142; G06F 3/04146; G06F 2203/04105; G06F 2203/04111; G06F 3/04166; G06F 2203/04112; G06F 3/0446; G06F 3/045; G06F 3/0414; G06F 3/0412; G06F 3/04164; G06F 3/044
See application file for complete search history.

(56) References Cited

U.S. PATENT DOCUMENTS

| | | |
|---|---|---|
| 2009/0213090 A1 | 8/2009 | Mamba et al. |
| 2014/0168138 A1 | 6/2014 | Kuo et al. |
| 2015/0205436 A1* | 7/2015 | Iwamoto ................. G06F 3/044 345/174 |
| 2016/0195955 A1* | 7/2016 | Picciotto ............ G06F 3/04144 345/174 |
| 2017/0108975 A1 | 4/2017 | Zhang et al. |
| 2017/0285799 A1* | 10/2017 | Iuchi ..................... G06F 3/0445 |

(Continued)

FOREIGN PATENT DOCUMENTS

| | | |
|---|---|---|
| EP | 3 719 618 A1 | 10/2020 |
| KR | 10-2018-0134800 A | 12/2018 |

(Continued)

*Primary Examiner* — Amit Chatly
(74) *Attorney, Agent, or Firm* — Lewis Roca Rothgerber Christie LLP

(57) ABSTRACT

A display device, includes: a display panel having short sides and long sides; and a touch sensor on the display panel and including a sensing area and a non-sensing area around the sensing area, wherein the touch sensor includes: a first touch electrode unit including a plurality of first touch electrodes in the sensing area, arranged in a direction in which the short sides of the display panel extend, and each including a first opening; a second touch electrode unit including a plurality of second touch electrodes in the sensing area, arranged in a direction in which the long sides of the display panel extend, and each including a second opening; and a pressure sensor including a strain gauge, at least a part of the strain gauge being located in the sensing area.

22 Claims, 31 Drawing Sheets

(56) References Cited

U.S. PATENT DOCUMENTS

| | | | |
|---|---|---|---|
| 2018/0061899 A1* | 3/2018 | Oh | H01L 51/5246 |
| 2019/0339817 A1 | 11/2019 | Kim et al. | |
| 2019/0384458 A1* | 12/2019 | Gong | G06F 3/0414 |
| 2020/0319735 A1 | 10/2020 | Kim et al. | |
| 2021/0041973 A1* | 2/2021 | Ebisui | G06F 3/0412 |
| 2021/0165521 A1 | 6/2021 | Yang | |

FOREIGN PATENT DOCUMENTS

| | | |
|---|---|---|
| KR | 10-1965871 B1 | 4/2019 |
| KR | 10-2020-0117084 A | 10/2020 |

* cited by examiner

150m: 151m, 153m, 155m, 157m, 159m
150n: 151n, 153n, 155n, 157n, 159n

150m: 151m, 153m, 155m, 157m, 159m
150n: 151n, 153n, 155n, 157n, 159n

DISPLAY DEVICE INCLUDING TOUCH SENSOR

CROSS-REFERENCE TO RELATED APPLICATION

The present application claims priority to and the benefit of Korean Patent Application No. 10-2020-0020789, filed on Feb. 20, 2020 in the Korean Intellectual Property Office, the disclosure of which is incorporated herein by reference in its entirety.

BACKGROUND

1. Field

Aspects of some example embodiments of the present invention relate to a display device including a touch sensor.

2. Description of the Related Art

A display device may be utilized for displaying images and incorporated into various electronic appliances for displaying images to users, such as smart phones, tablet PCs, digital cameras, notebook computers, navigators, and televisions. Display devices generally include a display panel for generating and displaying images and various input devices.

In the fields of smart phones and tablet PCs, a touch sensor for recognizing a touch input may be utilized as an input device for display devices. The touch sensor tends to replace a physical input device such as a keypad with the convenience of touch.

A pressure sensor may be utilized for detecting the intensity of pressure as an alternative to a physical button by applying the pressure sensor to a display device in addition to a touch sensor for detecting a touch position.

The above information disclosed in this Background section is only for enhancement of understanding of the background and therefore the information discussed in this Background section does not necessarily constitute prior art.

SUMMARY

Aspects some example embodiments of the present invention include a display device including a touch sensor capable of detecting pressure.

However, aspects of embodiments according to the present invention are not restricted to those specifically set forth herein. The above and other aspects of embodiments according to the present invention will become more apparent to one of ordinary skill in the art to which the present invention pertains by referencing the detailed description of the present invention given below.

According to some example embodiments of the present invention, a display device includes a display panel having short sides and long sides; and a touch sensor including a sensing area and a non-sensing area around the sensing area on the display panel, wherein the touch sensor includes: a first touch electrode unit including a plurality of first touch electrodes located in the sensing area, arranged in a direction in which the short sides of the display panel extend, and each including a first opening; a second touch electrode unit including a plurality of second touch electrodes located in the sensing area, arranged in a direction in which the long sides of the display panel extend, and each including a second opening; and a pressure sensor including a strain gauge, at least a part of the strain gauge being located in the sensing area, wherein, in the second opening of the at least one second touch electrode, the strain gauge includes a plurality of first resistance lines and a plurality of second resistance lines which are electrically connected to each other in a direction in which the long sides of the display panel extend.

According to some example embodiments of the present invention, a display device includes a display panel including a first display area having short sides and long sides and a second display area along one long side of the first display area and bent downward; a touch sensor on the display panel and including a sensing area and a non-sensing area around the sensing area, wherein the touch sensor includes: a first touch electrode unit including a plurality of first touch electrodes located in the sensing area, arranged in a direction in which the short sides of the display panel extend, and each including a first opening; a second touch electrode unit including a plurality of second touch electrodes located in the sensing area, arranged in a direction in which the long sides of the display panel extend, and each including a second opening; and a pressure sensor including a strain gauge, at least a part of the strain gauge being located in the sensing area, wherein, in the second opening of the at least one second touch electrode, the strain gauge includes a plurality of first resistance lines and a plurality of second resistance lines which are electrically connected to each other in a direction in which the long sides of the display panel extend.

BRIEF DESCRIPTION OF THE DRAWINGS

The above and other aspects and characteristics of embodiments according to the present invention will become more apparent by describing in more detail aspects of some example embodiments thereof with reference to the attached drawings, in which.

DETAILED DESCRIPTION

Figure 1:
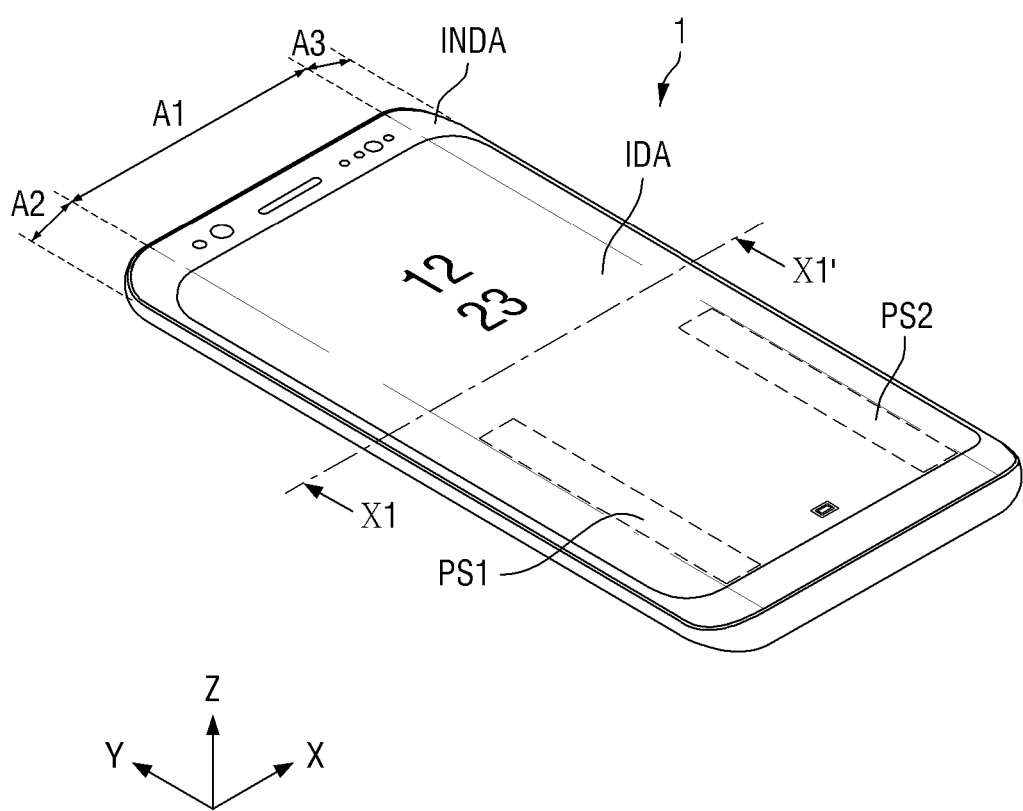
FIG. 1 is a schematic perspective view of a display device according to some example embodiments.

Aspects of some example embodiments of the present invention will now be described more fully hereinafter with reference to the accompanying drawings, in which example embodiments of the invention are shown. This invention may, however, be embodied in different forms and should not be construed as limited to the example embodiments set forth herein. Rather, these example embodiments are provided so that this disclosure will be more thorough and more complete, and will more fully convey the scope of embodiments according to the present invention to those skilled in the art. The same reference numbers indicate the same components throughout the specification. In the attached figures, the thickness of layers and regions is exaggerated for clarity.

It will also be understood that when a layer is referred to as being "on" another layer or substrate, it can be directly on the other layer or substrate, or intervening layers may also be present. In contrast, when an element is referred to as being "directly on" another element, there are no intervening elements present.

Although the terms "first", "second", etc. may be used herein to describe various elements, these elements should not be limited by these terms. These terms may be used to distinguish one element from another element. Thus, a first element discussed below may be termed a second element without departing from teachings of one or more example embodiments. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)", etc., respectively.

Aspects of some example embodiments of the present invention will be described with reference to perspective views, cross-sectional views, and/or plan views, in which example embodiments of the invention are shown. Thus, the profile of an example view may be modified according to manufacturing techniques and/or allowances. That is, the embodiments of the invention are not intended to limit the scope of the example embodiments described herein, but cover all changes and modifications that can be caused due to a change in manufacturing process. Thus, regions shown in the drawings are illustrated in schematic form and the shapes of the regions are presented simply by way of illustration and not as a limitation.

The size and thickness of each component shown in the drawings are illustrated for convenience of description, and embodiments according to the present invention are not necessarily limited to the size and thickness of the illustrated component.

Hereinafter, aspects of some example embodiments of the present invention will be described with reference to the attached drawings.

Figure 2:
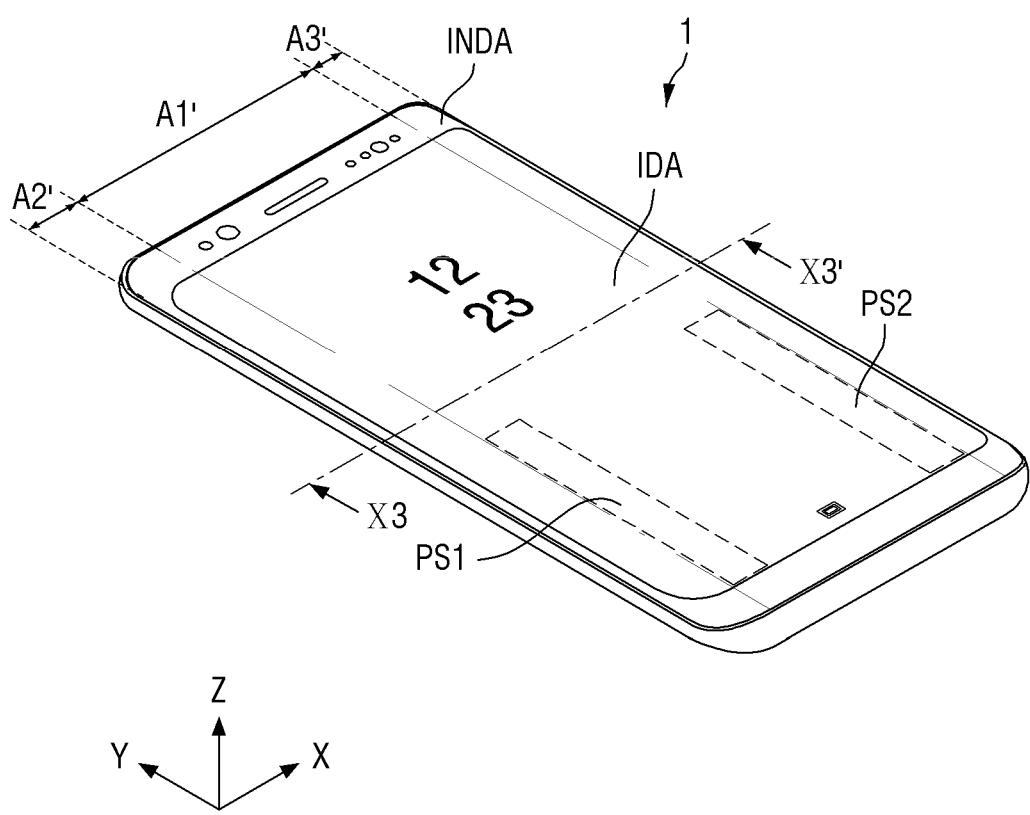
FIG. 2 is a schematic perspective view of a display device according to some example embodiments.

FIG. 1 is a schematic perspective view of a display device according to some example embodiments, and FIG. 2 is a schematic perspective view of a display device according to some example embodiments.

Referring to FIGS. 1 and 2, a display device 1 may be applied to a portable terminal or the like. Examples of the portable terminal may include tablet personal computers (PCs), smart phones, personal digital assistants (PDAs), portable multimedia players (PMPs), game machines, and wristwatch-type electronic appliances. However, embodiments according to the present invention are not limited to specific kinds of the display device 1. For example, according to some example embodiments, the display device 1 may be used in not only large-sized electronic appliances such as televisions or outdoor billboards but also small-sized and middle-sized electronic appliances such as personal computers, notebook computers, automobile navigators, smart watches, and cameras.

Unless otherwise defined, as used herein, the "on", "over", "top", "upper side", or "upper surface" refers to a direction of an arrow in the third direction Z intersecting the first direction X and the second direction Y, with respect to the drawing, and the "beneath", "under", "bottom", "lower side", or "lower surface" refers to a direction opposite to the direction of the arrow in the third direction Z.

Referring to FIG. 1, the display device 1 may be provided over at least one surface of a portable terminal. Here, at least one surface may be an upper surface of the portable terminal. The display device 1 may include a first area A1, a second area A2, and a third area A3, which are placed on different planes from each other.

The first area A1 may include both short sides extending in the first direction X and both long sides extending in the second direction Y intersecting the first direction X. An edge where the long side and the short side of the first area A1 meet may form a curved surface. In addition, the planar shape of the first area A1 is not limited thereto, and may be a circular shape or other shapes. The first area A1 may be placed or arranged on the first plane. According to some example embodiments, the first area A1 of the display device 1 may be used as a main display surface.

The second area A2 is located alone one long side of the first area A1 and is connected to the first area A1, but is bent or warped therefrom. The second area A2 may be placed on a second plane having an intersection angle (e.g., a set or predetermined intersection angle) with respect to the first plane, or may have a curved surface. According to some example embodiments, the second area A2 may be bent or warped from the first area A1 toward the lower side of the first area A1.

The third area A3 is located alone the other long side of the first area A1 and is connected to the first area A1, but is bent or warped therefrom. That is, the third area A3 may be located at the opposite side of the second area A2 with the first area A1 therebetween. The third area A3 may be placed on a third plane having an intersection angle (e.g., a set or predetermined intersection angle) with respect to the first plane, or may have a curved surface. According to some example embodiments, the third area A3 may be bent or warped from the first area A1 toward the lower side of the first area A1.

Referring to FIG. 2, according to some example embodiments, the first area, the second area, and the third area may be placed on the same plane. Alternatively, only one of the second area and the third area may be placed on the same plane as the first area.

According to some example embodiments, at least one of the lengths of the second area A2 or the third area A3 in the second direction y may be the same as the length of the first area A1 in the second direction y.

Hereinafter, an embodiment in which the first area A1 of the display device 1 is a flat portion, the second area A2 thereof is a first side portion, and the third area A3 thereof is a second side portion will be described as example, but embodiments according to the present invention are not limited thereto.

When an area of the display device 1 is divided by whether or not an image is displayed, the display device 1 includes a display area IDA in which an image is displayed and a peripheral area INDA adjacent to the display area IDA. The display area IDA is an area in which an image is displayed, and the peripheral area INDA may be an area in which an image is not displayed.

According to some example embodiments, the display area IDA may be located over (e.g., overlapping) the first area A1, the second area A2, and the third area A3, and the peripheral area INDA may surround the display area IDA. According to some example embodiments, a portion located in the first area A1 of the display area DIA and a portion located in the second area A2 of the display area IDA may be continuous without being separated from each other, and a portion located in the first area A1 of the display area DIA and a portion located in the third area A3 of the display area IDA may also be continuous without being separated from each other.

According to some example embodiments, the display device 1 may include a pressure sensor. The pressure sensor may be used as an input device of the display device 1 and may replace a physical button. Illustratively, the pressure sensor may function as a volume button, a power button, a menu button, or the like of the display device 1.

A case where at least one pressure sensor is provided in the first area A1 is illustrated as an example. The pressure sensor may be provided along the second direction Y. When the pressure sensor is provided along the second direction Y, the sensing sensitivity of the pressure sensor to the pressure applied perpendicularly to the length direction of the display device 1 may be improved. The at least one pressure sensor may include a first pressure sensor PS1 and a second pressure sensor PS2.

According to some example embodiments, the first pressure sensor PS1 and the second pressure sensor PS2 may be provided in at least a part of the first area A1 along the second direction Y. Here, at least a part of the first area A1 may be an area adjacent to the long side of the first area A1 extending in the second direction. According to some example embodiments, at least a part of the first area A1 may be located in a direction opposite to the direction in which a camera of a portable terminal is located based on the center of the first area A1, or may be located in a direction in which a home button of a portable terminal is located.

The shapes or arrangements of the first pressure sensor PS1 and the second pressure sensor PS2 in FIGS. 1 and 2 are only examples, and are not limited to the embodiments of FIGS. 1 and 2.

Hereinafter, a case where the display device 1 includes a first pressure sensor PS1 and a second pressure sensor PS2 will be described as an example, but this is only one example. According to some example embodiments, at least one of the first pressure sensor PS1 and the second pressure sensor PS2 may be omitted. Alternatively, according to some example embodiments, a pressure sensor may be further added in addition to the first pressure sensor PS1 and the second pressure sensor PS2.

According to some example embodiments, each of the first pressure sensor PS1 and the second pressure sensor PS2 may include a strain gauge or the like. Alternatively, each of the first pressure sensor PS1 and the second pressure sensor PS2 may be formed of a transducer such as a variable capacitor or a variable inductor. Hereinafter, a case where each of the first pressure sensor PS1 and the second pressure sensor PS2 may include a strain gauge or the like will be described as an example.

Figure 3:
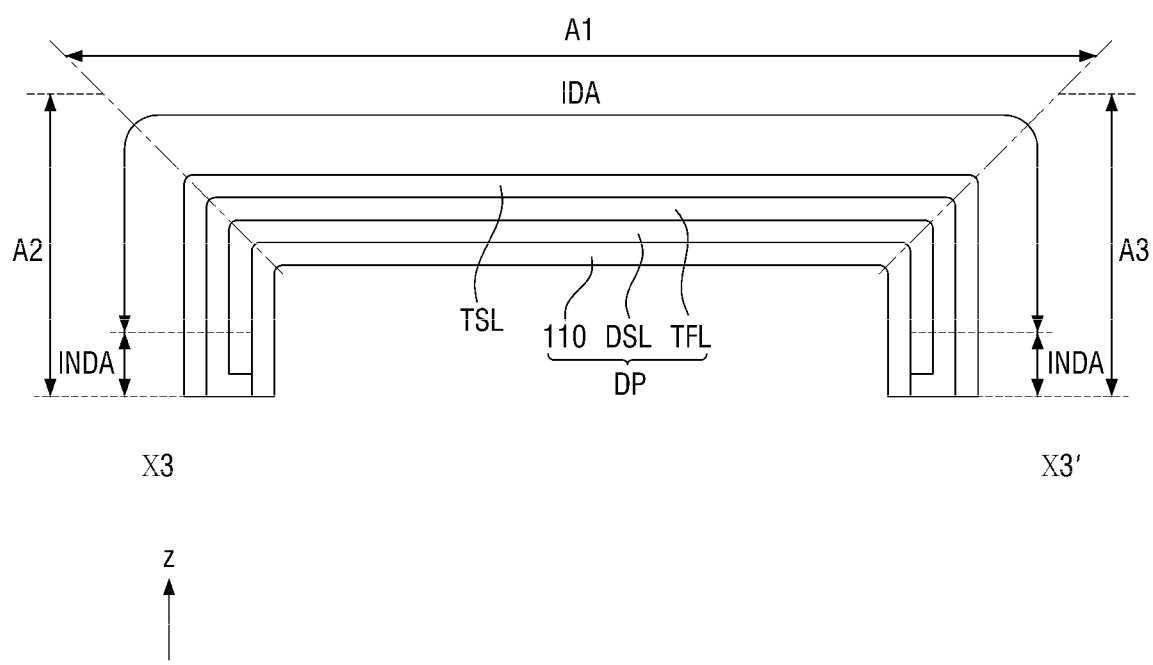
FIG. 3 is a schematic cross-sectional view of the display device taken along the line X1-X1' of FIG. 1.
Figure 4:
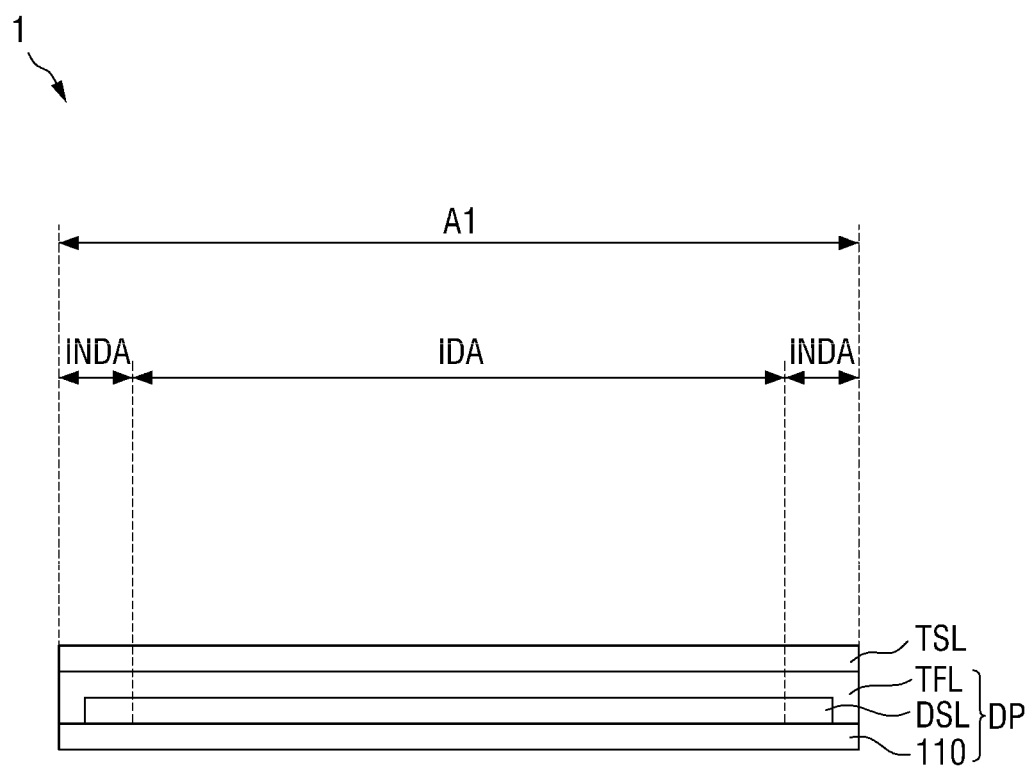
FIG. 4 is a schematic cross-sectional view of the display device taken along the line X3-X3' of FIG. 2.
Figure 5:
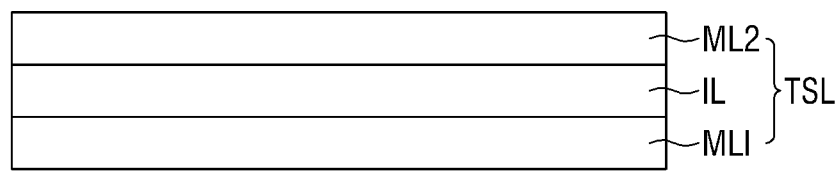
FIG. 5 is an enlarged cross-sectional view of the touch sensor layer shown in FIGS. 3 and 4.
Figure 6:
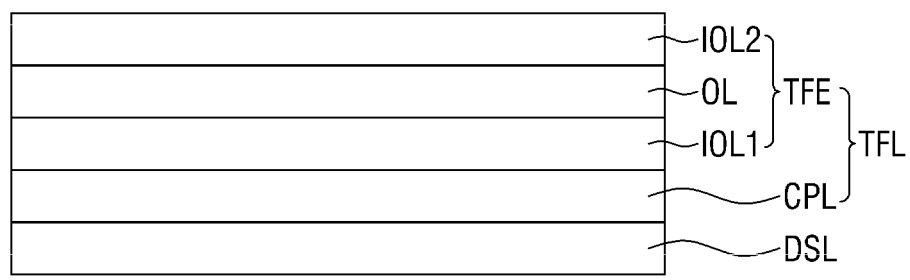
FIG. 6 is an enlarged cross-sectional view of the upper insulating layer shown in FIGS. 3 and 4.

FIG. 3 is a schematic cross-sectional view of the display device taken along the line X1-X1' of FIG. 1, FIG. 4 is a schematic cross-sectional view of the display device taken along the line X3-X3' of FIG. 2, FIG. 5 is an enlarged cross-sectional view of the touch sensor layer shown in FIGS. 3 and 4, and FIG. 6 is an enlarged cross-sectional view of the upper insulating layer shown in FIGS. 3 and 4.

A schematic stack structure of the display device 1 will be described with reference to FIGS. 3 to 6. The display device 1 includes a display panel DP and a touch sensor. The touch sensor may include a touch sensor layer TSL located on the display panel DP. The display panel DP generates an image, and the touch sensor acquires coordinate information of an external input (touch event). According to some example embodiments, the display device 1 may further include a protection member located under the display panel DP, an anti-reflection member located on the touch sensor layer TSL, and/or a window member.

According to some example embodiments, the display panel DP may include a self-emitting element. According to some example embodiments, the self-emitting element may include at least one of an organic light emitting diode, a quantum dot light emitting diode, an inorganic material-based micro light emitting diode (for example, micro light emitting diode), and an inorganic material-based nano light emitting diode (for example, nano light emitting diode).

The display panel DP may include a base substrate 110, an element layer DSL located on the base substrate 110, and an upper insulating layer TFL located on the element layer DSL.

The base substrate 110 is a substrate supporting the element layer DSL. According to some example embodiments, the base substrate 110 may include an insulating material. According to some example embodiments, the base substrate 110 may be a flexible substrate, and may include an insulating material such as a polymer resin. Examples of the polymer resin may include polyethersulphone (PES), polyacryLate (PA), polyaryLate (PAR), polyetherimide (PEI), polyethylene napthalate (PEN), polyethylene terepthalate (PET), polyphenylene sulfide (PPS), polyally-late, polyimide (PI), polycarbonate (PC), cellulose triacetate (CAT), cellulose acetate propionate (CAP), and combinations thereof.

The element layer DSL is located on the base substrate 110. According to some example embodiments, the element layer DSL may include a plurality of pixels and a plurality of display signal lines located on the base substrate 110. Each pixel may include a thin film transistor TFT, a capacitor, and a light emitting element, which will be described in more detail below. The plurality of display signal lines may include a scan line transmitting a scan signal to each pixel and a data line transmitting a data signal to each pixel.

According to some example embodiments, pixels included in the element layer DSL may be located in the display area IDA.

The element layer DSL may further include elements and wirings located on the base substrate 110 and located in the peripheral area INDA. The elements and wirings may generate various signals applied to pixels or transmit the signals to the pixels.

The upper insulating layer TFL may be located on the element layer DSL. The upper insulating layer TFL may protect the element layer DSL.

As shown in FIG, the upper insulating layer TFL may include a thin film encapsulation layer TFE, and may further include a capping layer CPL.

The thin film encapsulation layer TFE may include a first inorganic layer IOL1, an organic layer OL, and a second inorganic layer IOL2.

The capping layer CPL may be located on the element layer DSL, and according to some example embodiments, may be located on a cathode electrode of the element layer DSL. According to some example embodiments, the capping layer CPL may be in contact with the cathode electrode. The capping layer CPL may include an organic material.

The thin film encapsulation layer TFE may include a first inorganic layer IOL1, an organic layer OL, and a second inorganic layer IOL2.

The first inorganic layer IOL1 is located on the capping layer CPL and contacts the capping layer CPL. The organic layer OL is located on the first inorganic layer IOL1 and contacts the first inorganic layer IOL1. The second inorganic layer IOL2 is located on the organic layer OL and contacts the organic layer OL.

The capping layer CPL protects the cathode electrode from a subsequent process, such as a sputtering process, and improves the light emission efficiency of the self-emitting element. The capping layer CPL may have a larger refractive index than the first inorganic layer IOL1.

The first inorganic layer IOL1 and the second inorganic layer IOL2 protect the element layer DSL from moisture/oxygen, and the organic layer OL protects the element layer DSL from foreign matter such as dust particles. Each of the first inorganic layer IOL1 and the second inorganic layer IOL2 may be any one of a silicon nitride layer, a silicon oxynitride layer, and a silicon oxide layer. According to some example embodiments, each of the first inorganic layer IOL1 and the second inorganic layer IOL2 may include a titanium oxide layer or an aluminum oxide layer. The organic layer OL may include an acrylate-based organic layer, but is not limited thereto.

According to some example embodiments of the present invention, an inorganic layer, such as a lithium fluorine (LiF) layer, may be further located between the capping layer CPL and the first inorganic layer IOL1. The lithium fluorine layer may improve the light emission efficiency of the self-emitting element.

The touch sensor layer TSL may be located on the upper insulating layer TFL. According to some example embodiments, the touch sensor layer TSL may be located on the thin film encapsulation layer TFE, and a separate bonding layer (for example, an adhesive layer) may not be located between the thin film encapsulation layer TFE and the touch sensor layer TSL. Illustratively, at least one of the touch electrode unit, the touch wiring, and the pressure wiring included in the touch sensor layer TSL may be located directly on the thin film encapsulation layer TFE.

Alternatively, when a separate buffer layer or an insulating layer is located between the touch sensor layer TSL and the thin film encapsulation layer TFE, at least one of the touch electrode unit, the touch wiring, and the pressure wiring included in the touch sensor layer TSL may be located directly on the insulating layer on the thin film encapsulation layer TFE. That is, the base layer providing a base surface to the touch sensor layer TSL may be a thin film encapsulation layer TFE or may include a thin film encapsulation layer TFE.

The touch sensor including the touch sensor layer TSL may acquire coordinates of a touch input point in a capacitance method. In the capacitance manner, coordinate information of a touched point may be acquired by a self-capacitance method or a mutual-capacitance method. Hereinafter, for convenience of description, a case where the touch sensor layer TSL is formed as a mutual capacitance type structure will be described as an example, but embodiments according to the present invention are not limited thereto.

According to some example embodiments, a portion of the touch sensor layer TSL located in the display area IDA may include a touch electrode unit, and a portion of the touch sensor layer TSL located in the peripheral area INDA may include a touch signal line that transmits and/or receives a signal to and/or from the touch electrode unit.

According to some example embodiments, the touch sensor layer TSL may further include the above-described first pressure sensor PS1 and second pressure sensor PS2.

Explaining the stack structure of the touch sensor layer TSL, in some embodiments, the touch sensor layer TSL may include a first conductive layer ML1, an insulating layer IL, and a second conductive layer ML2 as shown in FIG. 5.

The first conductive layer ML1 may include an opaque conductive material. In some embodiments, the first conductive layer ML1 may include a metal such as gold (Au), silver (Ag), aluminum (AL), molybdenum (Mo), chromium (Cr), titanium (Ti), nickel (Ni), neodymium (Nd)), copper (Cu), or platinum (Pt), or may include an alloy thereof. In some embodiments, the first conductive layer ML1 may have a single-layer structure or a multi-layer structure. Illustratively, the first conductive layer ML1 may have a three-layer structure of titanium/aluminum/titanium.

An insulating layer IL may be located on the first conductive layer ML1. The insulating layer IL may be located between the first conductive layer ML1 and the second conductive layer ML2. According to some example embodiments, the insulating layer IL may include an insulating material. According to some example embodiments, the insulating material may be an inorganic insulating material or an organic insulating material. The inorganic insulating material may include at least one of aluminum oxide, titanium oxide, silicon oxide silicon oxynitride, zirconium oxide, and hafnium oxide. The organic insulating material may include at least one of acrylic resin, methacrylic resin, polyisoprene, vinyl resin, epoxy resin, urethane resin, cellulose resin, siloxane resin, polyimide resin, polyamide resin, and perylene resin.

The second conductive layer ML2 may be located on the insulating layer IL. In some embodiments, the second conductive layer ML2 may include a conductive material having light transmittance. Examples of the conductive material having light transmittance may include silver nanowires (AgNW), indium tin oxide (ITO), indium zinc oxide (IZO), antimony zinc oxide (AZO), indium tin zinc oxide (ITZO), and zinc oxide (ZnO), tin oxide (SnO2), carbon nanotubes, graphene, and conductive polymer (for example, PEDOT). Alternatively, the second conductive layer ML2 may include a conductive material such as a metal or an alloy thereof as long as light transmittance is secured. Example of the metal may include gold (Au), silver (Ag), aluminum (A1), molybdenum (Mo), chromium (Cr), titanium (Ti), nickel (Ni), neodymium (Nd), copper (Cu), and platinum (Pt). According to some example embodiments, when the second conductive layer ML2 is made of a metal or an alloy thereof, the second conductive layer ML2 may be formed to have a mesh structure to prevent a user from being viewed. Hereinafter, a case where the second conductive layer ML2 is formed to have a mesh structure will be described as an example.

Figure 7:
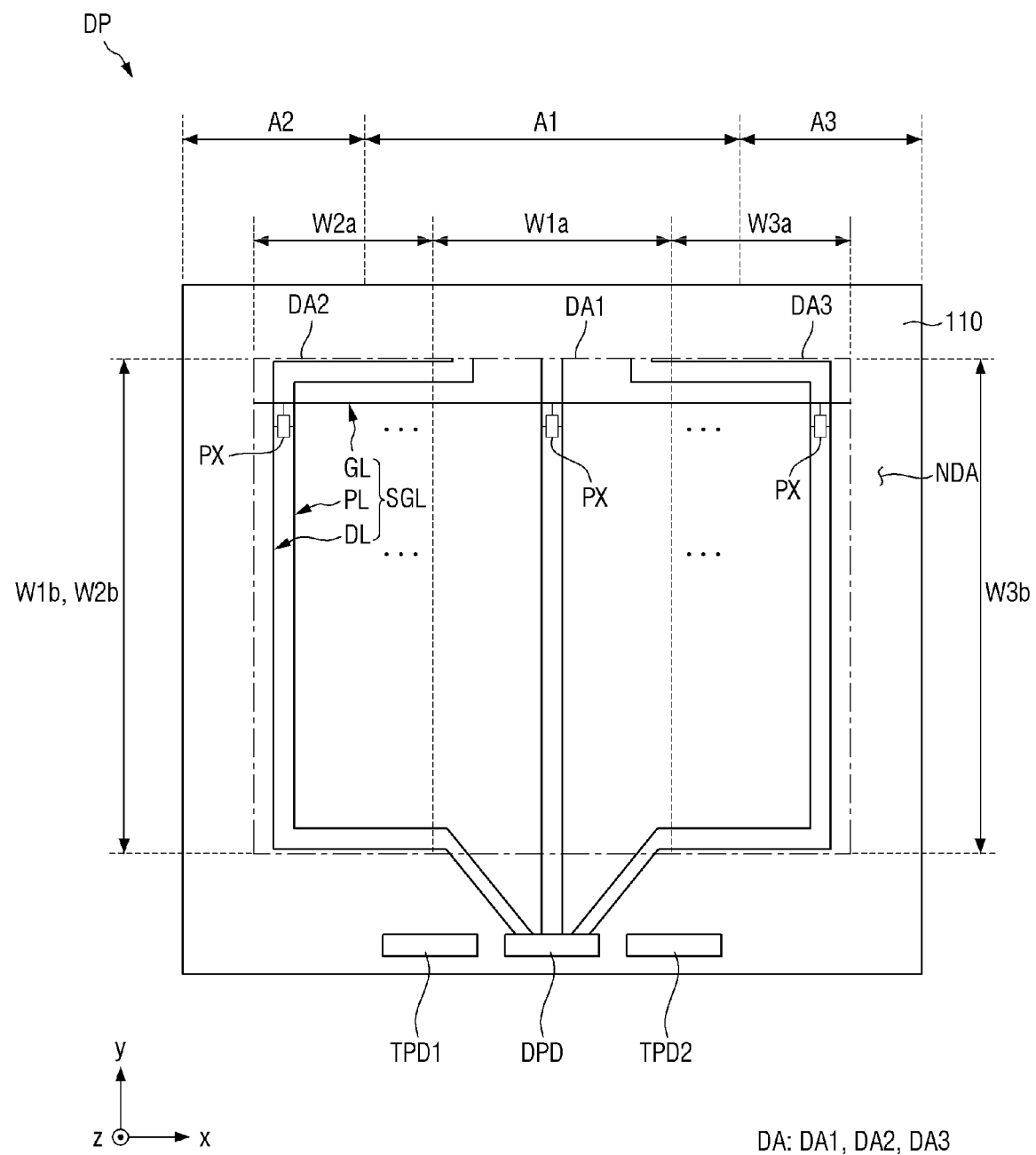
FIG. 7 is a schematic plan view of a display panel included in a display device according to some example embodiments.
Figure 8:
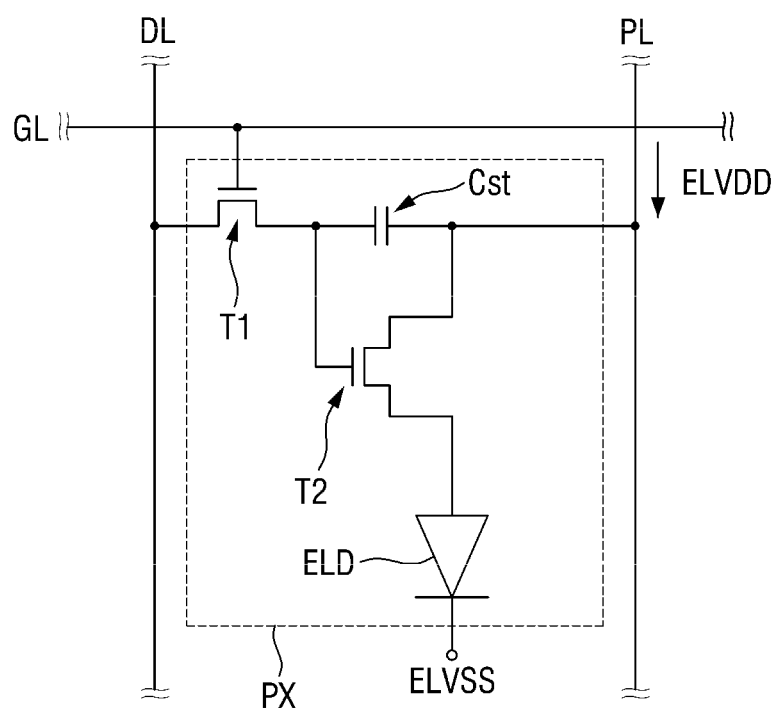
FIG. 8 is an example circuit diagram of the pixel shown in FIG. 7.
Figure 9:
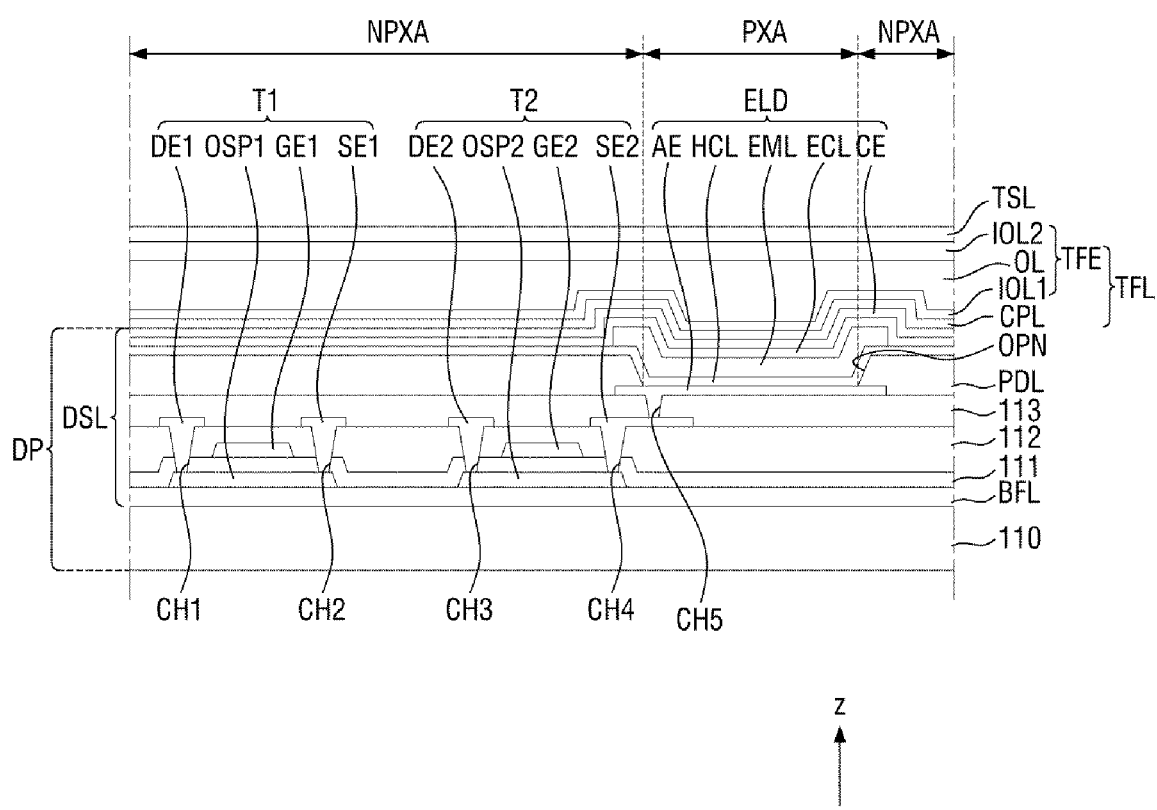
FIG. 9 is a schematic cross-sectional view of the pixel shown in FIG. 7 and a display device including the same.

FIG. 7 is a schematic plan view of a display panel included in a display device according to some example embodiments, FIG. 8 is an example circuit diagram of the pixel shown in FIG. 7, and FIG. 9 is a schematic cross-sectional view of the pixel shown in FIG. 7 and a display device including the same.

Referring to FIGS. 7 to 9, a display area DA and a non-display area NDA respectively corresponding to the display area IDA and the peripheral area INDA of the display device 1 shown in FIG. 1 may be defined. Hereinafter, when one area and another area correspond to each other, the two areas overlap each other and are not limited to having the same area.

The display area DA may include a first display area DA1 located in the first area A1, a second display area DA2, at least a part thereof being located in the first area A1 and the other part thereof being located in the second area A2, and a third display area DA3, at least a part thereof being located in the first area A1 and the other part thereof being located in the third area A3.

According to some example embodiments, the first width W1$a$ of the first display area DA1 measured along the first direction X may be wider than the first width W2$a$ of the second display area DA2 measured along the first direction X and the first width W3$a$ of the third display area DA3 measured along the first direction X. Further, the second width W1$b$ of the first display area DA1 measured along the second direction Y may be wider than the second width W2$b$ of the second display area DA2 measured along the second direction Y and the second width W3$b$ of the third display area DA3 measured along the second direction Y.

According to some example embodiments, the maximum width of the display area DA measured along the first direction X may be substantially the same as the sum of the first width W1$a$ of the first display area DA1, the first width W2$a$ of the second display area DA2 and the first width W3$a$ of the third display area DA3. Further, in some embodiments, the maximum width of the display area DA measured along the second direction y may be substantially the same as the second width W1$b$ of the first display area DA1.

In the display area DA, a plurality of signal lines SGL and a plurality of pixels PX may be located on the base substrate 110. In the non-display area NDA, a signal pad unit DPD may be located on the base substrate 110, and touch pad units TPD1 and TPD2 connected to the touch wirings and the pressure wirings included in the touch sensor layer may be further located on the base substrate 110.

The signal lines SGL, the pixels PX, and the signal pad unit DPD may be included in the element layer DSL. According to some example embodiments, the element layer DSL may further include the touch pad units TPD1 and TPD2.

The plurality of signal lines SGL may include a scan line GL, a data line DL, and a power supply line PL.

The scan line GL is connected to a corresponding pixel PX among the plurality of pixels PX to transmit a scan signal to the pixel PX.

The data line DL is connected to a corresponding pixel PX among the plurality of pixels PX to transmit a data signal to the pixel PX.

The power supply line PL is connected to the plurality of pixels PX to transmit a driving voltage to the pixels PX.

The signal pad unit DPD is located in the non-display area NDA, and may be connected to the signal lines SGL, for example, the data line DL. The signal pad unit DPD may receive a data signal from the outside.

According to some example embodiments, the scan line GL may extend along the first direction X, and the data line DL may extend along the second direction Y. In some embodiments, the power supply line PL may extend along the same second direction Y as the data line DL, but is not limited thereto.

FIG. 8 shows one scan line GL, one data line DL, one power line PL, and a pixel PX connected to them. The configuration of the pixel PX is not limited to FIG. 7, and may be modified and then implemented.

The pixel PX includes a self-emitting element ELD; and a first transistor T1 (or a switching transistor), a second transistor T2 (or driving transistor) and a capacitor Cst, which constitute a pixel driving circuit for driving the self-emitting element ELD. A first power voltage ELVDD is provided to the second transistor T2, and a second power voltage ELVSS is provided to the self-emitting element ELD. The second power voltage ELVSS may be lower than the first power voltage ELVDD.

The first transistor T1 outputs a data signal applied to the data line DL in response to a scan signal applied to the scan line GL. The capacitor Cst charges a voltage corresponding to the data signal received from the first transistor T1. The second transistor T2 is connected to the self-emitting element ELD. The second transistor T2 controls a driving current flowing through the self-emitting element ELD in response to the amount of charge stored in the capacitor Cst.

The equivalent circuit is only one embodiment and is not limited thereto. The pixel PX may further include a plurality of transistors, and may include a larger number of capacitors. The self-emitting element ELD may be connected between the power supply line PL and the second transistor T2.

According to some example embodiments, the self-emitting element ELD may be an organic light emitting element as described above. However, embodiments according to the present invention are not limited thereto, and the self-emitting element ELD may be any one of a quantum dot light emitting element, an inorganic material-based light emitting element, an inorganic material-based micro light emitting diode, and an inorganic material-based nano light emitting diode.

FIG. 9 shows a partial cross-section of the display panel DP corresponding to the equivalent circuit shown in FIG. 8, and shows the touch sensor layer TSL together.

Hereinafter, a stack structure of the display panel DP will be described in more detail below.

A buffer layer BFL may be located on the base substrate 110.

A semiconductor pattern (OSP1: hereinafter a first semiconductor pattern) of the first transistor T1 and a semiconductor pattern (OSP2: a second semiconductor pattern) of the second transistor T2 may be located on the buffer layer BFL. The first semiconductor pattern OSP1 and the second semiconductor pattern OSP2 may be selected from amorphous silicon, polysilicon, and a metal oxide semiconductor. In some embodiments, one of the first semiconductor pattern OSP1 and the second semiconductor pattern OSP2 may be made of polysilicon, and the other of the first semiconductor pattern OSP1 and the second semiconductor pattern OSP2 may be made of a metal oxide semiconductor.

A first insulating layer 111 is located on the first semiconductor pattern OSP1 and the second semiconductor pattern OSP2. A control electrode GE1 (hereinafter, first control electrode) of the first transistor T1 and a control electrode GE2 (hereinafter, second control electrode) of the second transistor T2 are located on the first insulating layer 111. When the first control electrode GE1 and the second control electrode GE2 are located on the same layer, the first control electrode GE1 and the second control electrode GE2 may be manufactured according to the same photolithography process as the scanning lines GL (refer to FIG. 6). However, embodiments according to the present invention are not limited thereto, and the first control electrode GE1 and the second control electrode GE2 may be located on different layers. In this case, only one of the first control electrode GE1 and the second control electrode GE2 may be manufactured according to the same photolithography process as the scanning lines GL (refer to FIG. 6).

A second insulating layer 112 covering the first control electrode GE1 and the second control electrode GE2 is located on the first insulating layer 111. An input electrode (DE1: hereinafter, first input electrode) and an output electrode (SE1: first output electrode) of the first transistor T1, and an input electrode (DE2: hereinafter, second input electrode) and an output electrode (SE2: second output electrode) of the second transistor T2 are located on the second insulating layer 112.

According to some example embodiments, each of the first insulating layer 111 and the second insulating layer 112 may include an inorganic material or an organic material.

The first input electrode DE1 and the first output electrode SE1 are connected to the first semiconductor pattern OSP1 through a first through hole CH1 and a second through hole CH2 each penetrating the first insulating layer 111 and the second insulating layer 112, respectively. The second input electrode DE2 and the second output electrode SE2 are connected to the second semiconductor pattern OSP2 through a third through hole CH3 and a fourth through hole CH4 each penetrating the first insulating layer 111 and the second insulating layer 112, respectively. Meanwhile, according to some example embodiments of the present invention, a part of the first transistor T1 and a part of the second transistor T2 may be implemented by being modified to a bottom gate structure.

An intermediate organic layer 113 covering the first input electrode DE1, the second input electrode DE2, the first output electrode SE1, and the second output electrode SE2 is located on the second insulating layer 112. The intermediate organic layer 113 may provide a flat surface.

A pixel defining layer PDL and a self-emitting element ELD may be located on the intermediate organic layer 113. The pixel defining layer PDL may include an organic material. An anode electrode AE is located on the intermediate organic layer 113. The anode electrode AE is connected to the second output electrode SE2 through a fifth through hole CH5 penetrating the intermediate organic layer 113. An opening OPN exposing at least a part of the anode electrode AE may be defined in the pixel defining layer PDL The pixel PX may be located in the display area DA. The display area DA may include a light emitting area PXA and a non-light emitting area NPXA adjacent to the light emitting area PXA. The non-light emitting area NPXA may surround the light emitting area PXA. According to some example embodiments, the light emitting area PXA is defined to correspond to a part of the anode electrode AE exposed by the opening OPN.

According to some example embodiments of the present invention, the light emitting area PXA may overlap at least one of the first and second transistors T1 and T2. The opening OPN may be enlarged, and the anode electrode AE and the light emitting layer EML to be described later may also be enlarged.

A hole control layer HCL may be commonly located in the light emitting area PXA and the non-light emitting area NPXA. According to some example embodiments, a common layer such as the hole control layer HCL may be commonly formed in the pixels PX (refer to FIG. 7).

A light emitting layer EML is located on the hole control layer HCL. The light emitting layer EML may generate a colored light (e.g., of a set or predetermined color). The light emitting layer EML may be located in an area corresponding to the opening OPN. According to some example embodiments, the light emitting layer EML may be formed separately from each of the pixels PX, but embodiments according to the present invention are not limited thereto. According to some example embodiments, at least a part of the light emitting layer EML may be located over two or more pixels PX.

When the self-emitting element ELD is an organic light emitting element, the light emitting layer EML may include an organic material. That is, according to some example embodiments, the light emitting layer EML may be an organic light emitting layer.

When the self-emitting element ELD is a quantum dot light emitting element, the light emitting layer EML may include a quantum dot material. That is, the light emitting layer EML may be a quantum dot light emitting layer.

The quantum dots may control the color of emitted light according to the particle size, and thus, the quantum dots may have various light emitting colors such as blue, red, and green.

An electronic control layer ECL is located on the light emitting layer EML. According to some example embodiments, the electronic control layer ECL may be commonly formed in the pixels PX.

A cathode electrode CE is located on the electronic control layer ECL. The cathode electrode CE is commonly located in the pixels PX.

The upper insulating layer TFL may be located on the cathode electrode CE, and the touch sensor layer TSL may be located on the upper insulating layer TFL or the thin film encapsulation layer TFE.

The anode electrode AE, the hole control layer HCL, the light emitting layer EML, the electron control layer ECL, and the cathode electrode CE, which are located in the light emitting area PXA may constitute the self-emitting element ELD.

That is, the self-emitting element ELD may be defined as a portion in which the anode electrode AE, the hole control layer HCL, the light emitting layer EML, the electronic control layer ECL, and the cathode electrode CE are all located in the light emitting area PXA.

Figure 10:
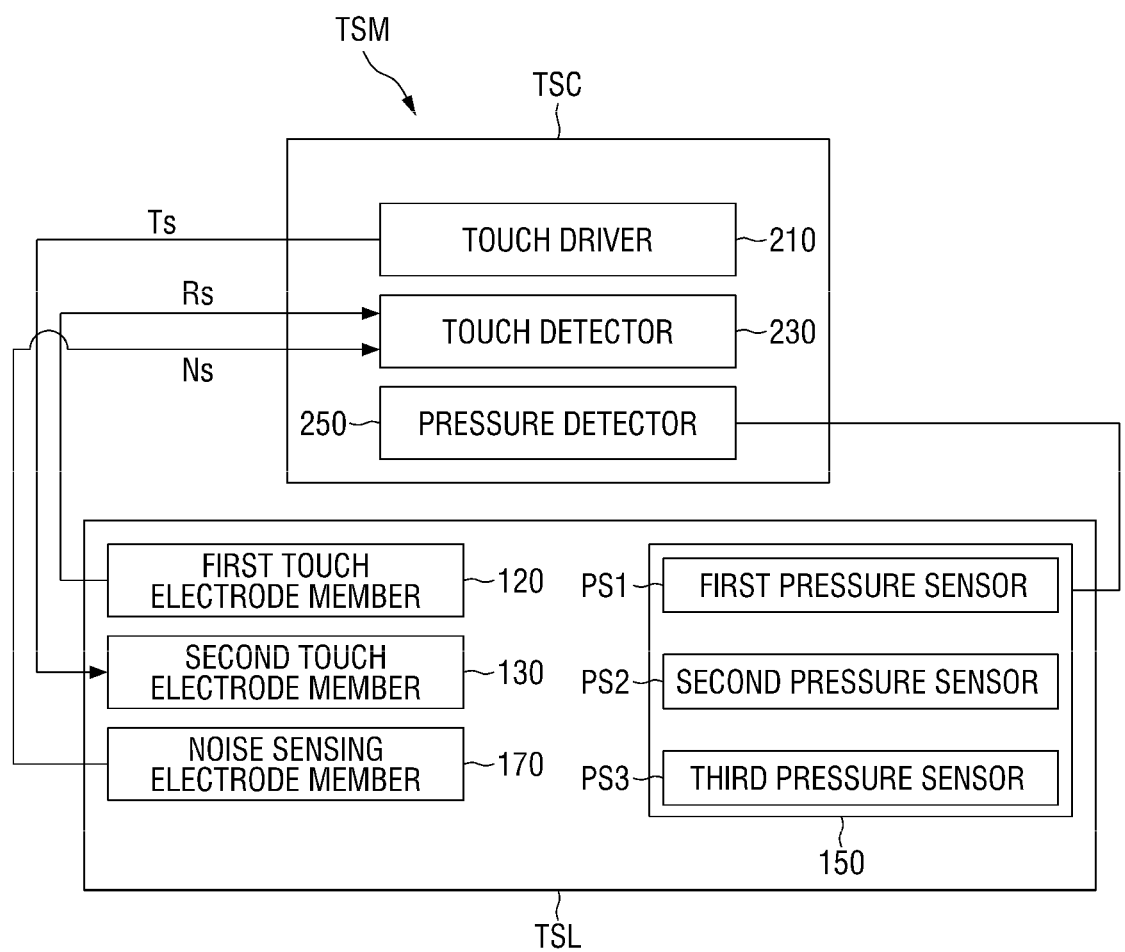
FIG. 10 is an example block diagram of a touch sensor included in a display device according to some example embodiments.

FIG. 10 is an example block diagram of a touch sensor included in a display device according to some example embodiments.

Referring to FIG. 10, a touch sensor TSM includes a touch sensor layer TSL and a touch controller TSC.

The touch sensor layer TSL may include a plurality of first touch electrode units 120 and a plurality of second touch electrode units 130 to detect a touch input.

The first touch electrode unit 120 and the second touch electrode unit 130 may be electrically connected to the touch controller TSC. According to some example embodiments, the second touch electrode unit 130 may be a driving electrode unit receiving a driving signal Ts for touch detection from the touch controller TSC, and the first touch electrode unit 120 may be a sensing electrode unit outputting a sensing signal Rs for touch detection to the touch controller TSC. Alternatively, according to some example embodiments, the first touch electrode unit 120 may be a driving electrode unit receiving a driving signal Ts, and the second touch electrode unit 130 may be a sensing electrode unit outputting a sensing signal Rs for touch detection. Hereinafter, although a case where the first touch electrode unit 120 is a sensing electrode unit and the second touch electrode unit 130 is a driving electrode unit will be described, embodiments according to the present invention are not limited thereto.

The first touch electrode unit 120 and the second touch electrode unit 130 may overlap at least one electrode provided in the display panel DP. For example, when the display panel DP is an organic light emitting display panel, the first touch electrode unit 120 and the second touch electrode unit 130 may overlap the cathode electrode CE and the like of the display panel DP shown in FIG. 8.

The touch sensor layer TSL may further include a noise sensing electrode unit 170.

The noise sensing electrode unit 170 may be electrically connected to the touch controller TSC, and for example, may be electrically connected to the touch detector 230 to be described later. The noise sensing electrode unit 170 may sense noise generated in the touch sensor layer TSL and provide the noise to the touch detector 230 as a noise sensing signal Ns.

The touch sensor layer TSL may further include a pressure sensor 150. In some embodiments, the pressure sensor 150 may include a first pressure sensor PS1, a second pressure sensor PS2, and a third pressure sensor PS3. According to some example embodiments, in the pressure sensor 150, a resistance value may be changed in response to an externally applied force or pressure. The pressure sensor 150 may be electrically connected to a pressure detector 250.

The touch controller TSC may be electrically connected to the touch sensor layer TSL to supply a driving signal Ts to the touch sensor layer TSL and receive a sensing signal Rs corresponding to the driving signal Ts from the touch sensor layer TSL to detect a touch position. Further, the touch controller TSC may be electrically connected to the pressure sensor 150 to detect touch pressure or touch force.

According to some example embodiments, the touch controller TSC may include a touch driver 210, a touch detector 230, and a pressure detector 250.

The touch driver 210 may provide a driving signal Ts for detecting a touch input to the second touch electrode unit 130.

The touch detector 230 may receive a sensing signal Rs corresponding to the driving signal Ts from the first touch electrode unit 120 to detect the presence and/or position of a touch input. According to some example embodiments, the sensing signal Rs may be a change in mutual capacitance generated between the first touch electrode unit 120 and the second touch electrode unit 130. For example, when a touch input occurs, the capacitance changes at a point where the touch input is provided or at a periphery thereof. The touch detector 230 may receive a change in mutual capacitance between the first touch electrode unit 120 and the second touch electrode unit 130 as a sensing signal Rs, and may grasp the presence and/or position of the touch input based on the change in mutual capacitance. Further, the touch detector 230 may receive a noise sensing signal Ns from the noise sensing electrode unit 170 and may remove or cancel noise included in the sensing signal Rs using the noise sensing signal Ns.

According to some example embodiments, the touch detector 230 may include at least one amplifier for amplifying the received sensing signal Rs, an analog-digital converter connected to the output terminal of the amplifier, and a processor. Further details thereof will be described later with reference to FIG. 18.

The pressure detector 250 may be electrically connected to the pressure sensor 150 and may detect touch pressure or touch force based on a change in resistance value of the pressure sensor 150. According to some example embodiments, the pressure detector 250 may include at least one Wheatstone bridge circuit unit.

According to some example embodiments, the touch driver 210, the touch detector 230, and the pressure detector 250 may be integrated in one touch IC. However, embodiments according to the present invention are not limited thereto.

According to some example embodiments, the touch driver 210 and the touch detector 230 may be integrated in one touch IC, and the pressure detector 250 may be located in a portion other than the touch IC. Illustratively, the pressure detector 250 may be located on the display panel DP or may be located on a separate flexible circuit board.

Hereinafter, the touch sensor TSM will be described in more detail below with reference to FIGS. 11 to 31.

Figure 11:
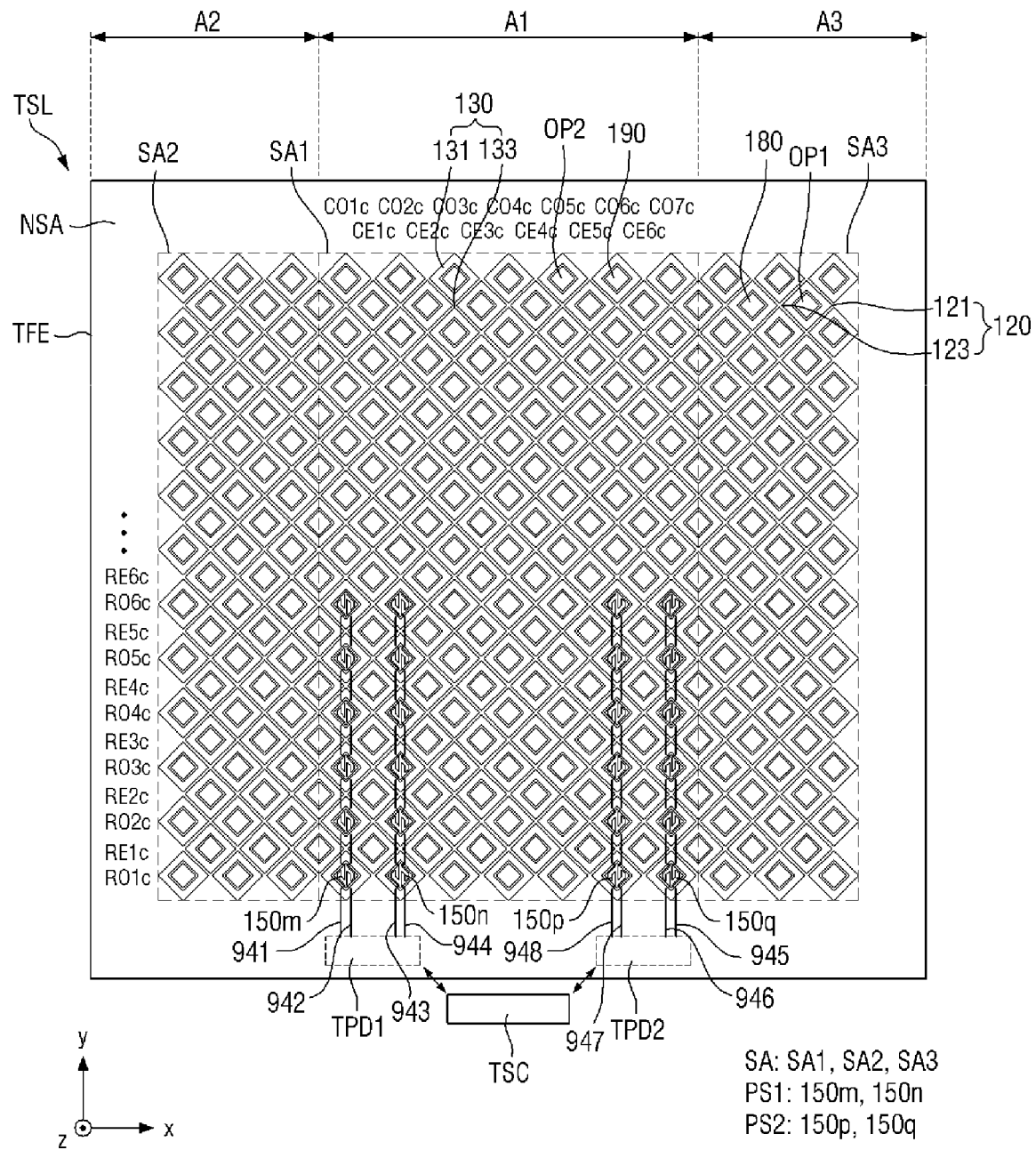
FIG. 11 is a view showing a touch sensor according to some example embodiments, in which a planar structure of an unfolded touch sensor layer and a connection relationship between a touch sensor layer and a touch controller are shown.
Figure 12:
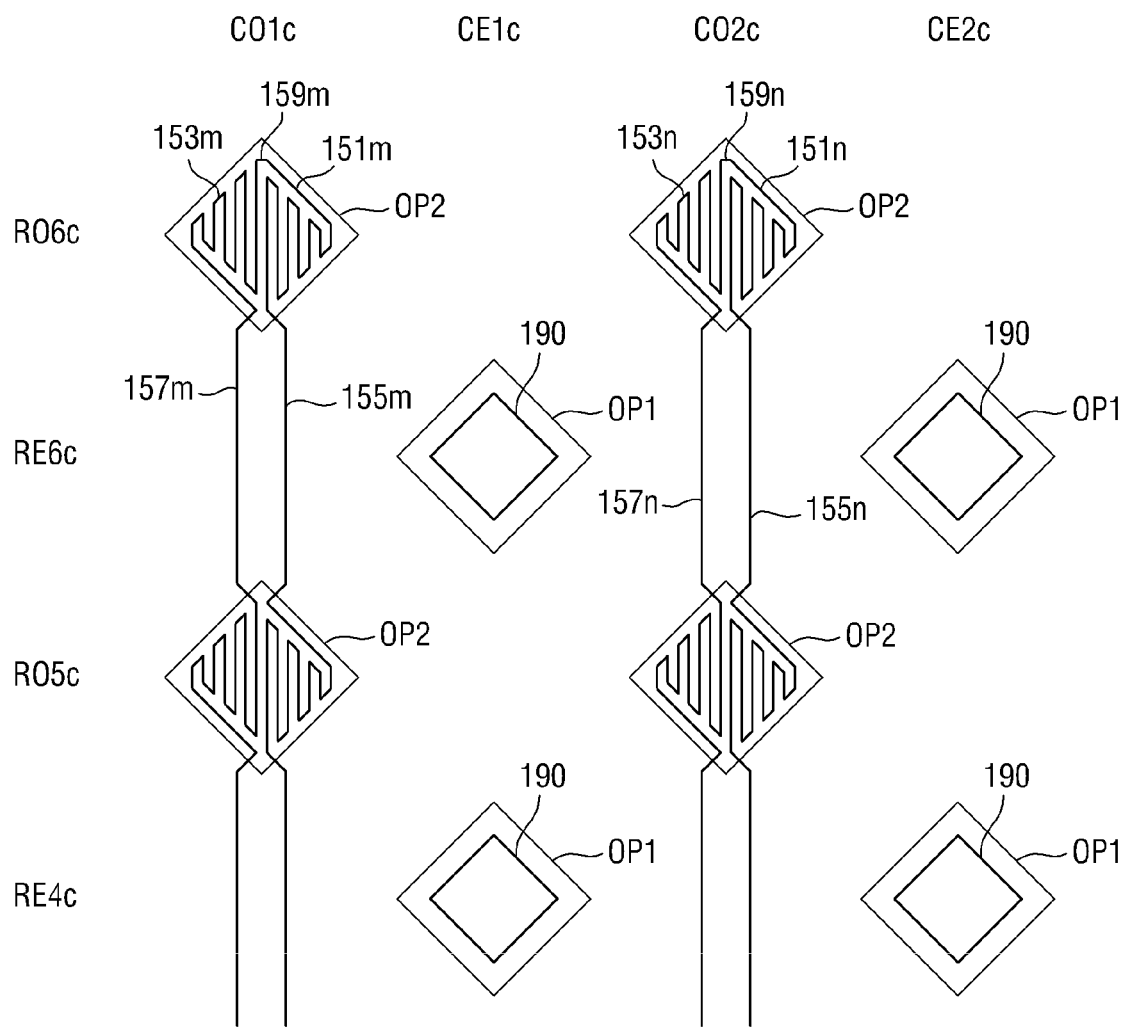
FIG. 12 is a view showing planar structures of the first pressure sensor and second pressure sensor shown in FIG. 11.
Figure 13:
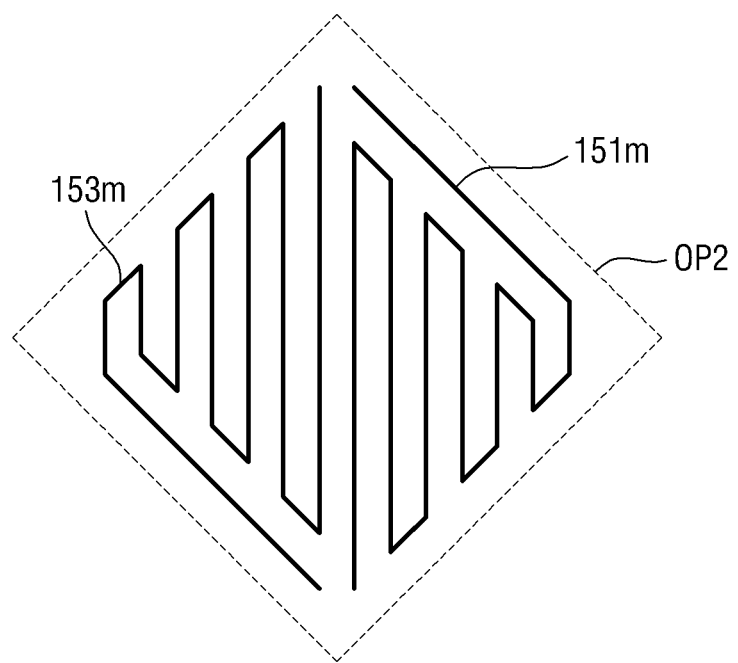
FIG. 13 is an enlarged plan view of a first resistance line and a second resistance line of the strain gauge shown in FIG. 12.
Figure 14:
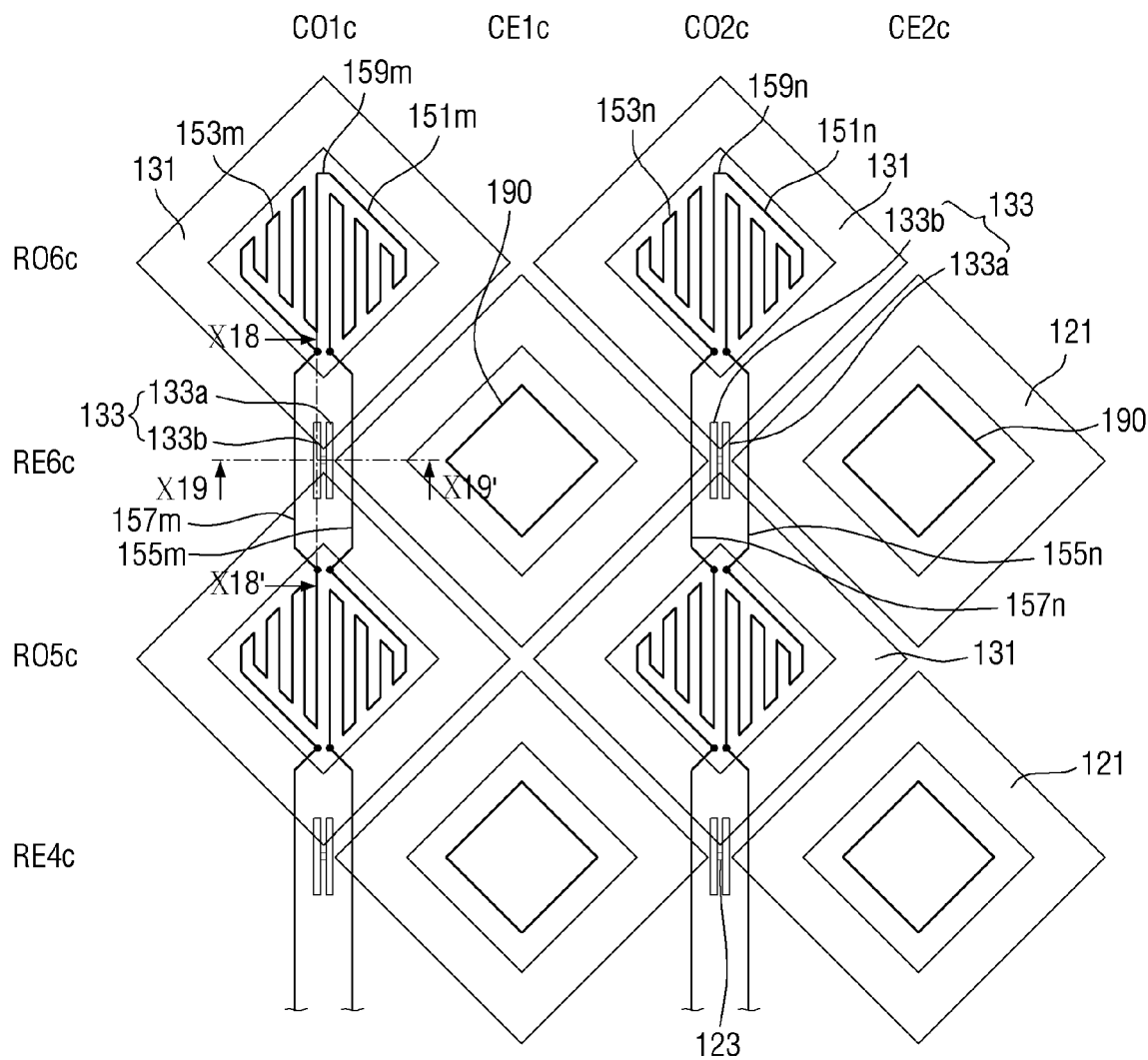
FIG. 14 is an enlarged plan view of the first pressure sensor shown in FIG. 11 and a first touch electrode unit and a second touch electrode unit around the first pressure sensor.
Figure 15:
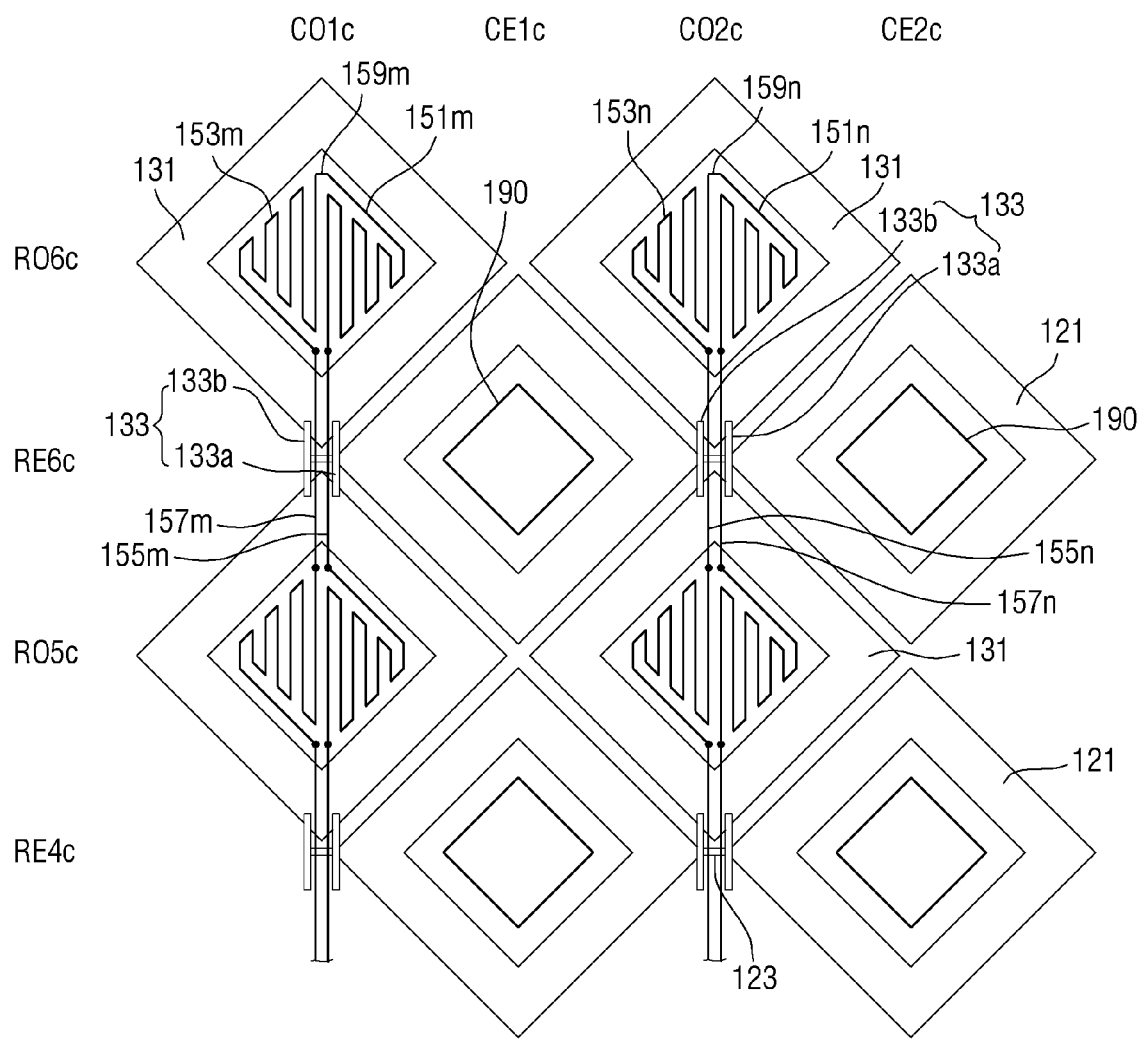
FIG. 15 is an enlarged plan view of a first pressure sensor according to some example embodiments and a first touch electrode unit and a second touch electrode unit around the first pressure sensor.
Figure 16:
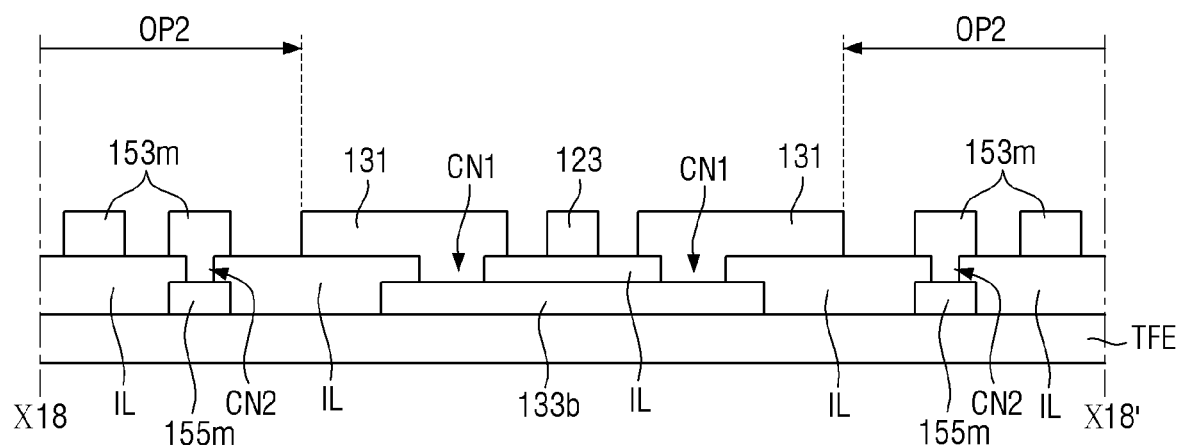
FIG. 16 is a schematic cross-sectional view of the touch sensor layer taken along the line X18-X18' of FIG. 14.
Figure 17:
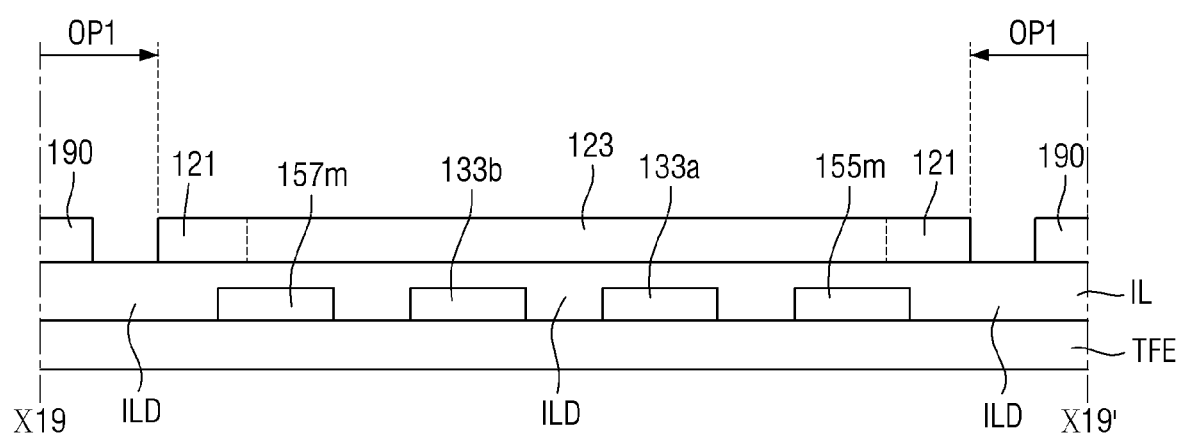
FIG. 17 is a schematic cross-sectional view of the touch sensor layer taken along the line X19-X19' of FIG. 14.

FIG. 11 is a view showing a touch sensor according to some example embodiments, in which a planar structure of an unfolded touch sensor layer and a connection relationship between a touch sensor layer and a touch controller are shown, FIG. 12 is a view showing planar structures of the first pressure sensor and second pressure sensor shown in FIG. 11, FIG. 13 is an enlarged plan view of a first resistance line and a second resistance line of the strain gauge shown in FIG. 12, FIG. 14 is an enlarged plan view of the first pressure sensor shown in FIG. 11 and a first touch electrode unit and a second touch electrode unit around the first pressure sensor, FIG. 15 is an enlarged plan view of a first pressure sensor according to some example embodiments and a first touch electrode unit and a second touch electrode unit around the first pressure sensor, FIG. 16 is a schematic cross-sectional view of the touch sensor layer taken along the line X18-X18' of FIG. 14, and FIG. 17 is a schematic cross-sectional view of the touch sensor layer taken along the line X19-X19' of FIG. 14.

Referring to FIG. 11, a sensing area SA and a non-sensing area NSA are defined in the touch sensor layer TSL. In the touch sensor layer TSL, the sensing area SA is an area detecting a touch input, and the non-sensing area NSA may be an area not detecting a touch input.

The sensing area SA may correspond to the display area IDA of the display device 1 shown in FIG. 1 or 2 or the display area DA of the display panel DP shown in FIG. 7. The non-sensing area NSA may correspond to the peripheral area INDA of the display device 1 shown in FIG. 1 or 2 or the non-display area NDA of the display panel DP shown in FIG. 7. According to some example embodiments, the sensing area SA may be substantially the same as the display area DA of the display panel DP shown in FIG. 7, and the non-sensing area NSA may be substantially the same as the non-display area NDA of the display panel DP shown in FIG. 7.

Hereinafter, the sensing area SA will be described in more detail below.

The sensing area SA is a first sensing area SA1 located in the first area A1, a second sensing area SA2, at least a part thereof being located in the first area A1 and the other part thereof being located in the second area A2, and a third sensing area SA3, at least a part thereof being located in the first area A1 and the other part thereof being located in the third area A3. The first sensing area SA1 may correspond to the first display area DA1 of the display panel DP shown in FIG. 7, the second sensing area SA2 may correspond to the second display area DA2 of the display panel DP shown in FIG. 7, and the third sensing area SA3 may correspond to the third display area DA3 of the display panel DP shown in FIG. 7.

According to some example embodiments, the first width W4a of the first sensing area SA1 measured along the first direction X may be larger than the first width W5a of the second sensing area SA2 measured along the first direction X and the first width W6a of the third sensing area SA3 measured along the first direction X. Further, the second width W6b of the first sensing area SA1 measured along the second direction Y may be larger than the second width W5b of the second sensing area SA2 measured along the second direction Y and the second width W6b of the third sensing area SA3 measured along the second direction Y.

According to some example embodiments, the maximum width of the sensing area SA measured along the first direction X may be substantially the same as the sum of the first width W4a of the first sensing area SA1, the first width W5a of the second sensing area SA2, and the first width W6a of the third sensing area SA3. In some embodiments, the maximum width of the sensing area SA measured along the second direction Y may be substantially the same as the second width W4b of the first sensing area SA1.

A part of the second sensing area SA2 is located in the second area A2 of the display device, that is, in the first side portion of the display device. Therefore, the second sensing area SA2 may be bent or folded in a direction opposite to the third direction Z.

A part of the third sensing area SA3 is located in the third area A3 of the display device, that is, the second side portion of the display device. Therefore, the third sensing area SA3 may be bent or folded in a direction opposite to the third direction Z.

As described above, a part of the display panel DP may be a base layer of the touch sensor layer TSL, and illustratively, the thin film encapsulation layer TFE may be a base layer of the touch sensor layer TSL. Hereinafter, the terms "thin film encapsulation layer TFE" and "base layer" are used interchangeably, and the same reference numerals are given.

The touch sensor layer TSL may include a first touch electrode unit 120, a second touch electrode unit 130, and a pressure sensor 150, which are located in the sensing area SA and located on the base layer TFE. The touch sensor layer TSL may further include a first pattern 180 and a second pattern 190. The pressure sensor 150 may include a first pressure sensor PS1 and a second pressure sensor PS2.

The plurality of first touch electrode units 120 may extend along the first direction X and may be spaced apart from each other along the second direction Y. The plurality of first touch electrode units 120 may be spaced apart from each other along the second direction Y. Each of the plurality of first touch electrode units 120 may constitute an electrode row. For convenience of description, the electrode rows of the first touch electrode unit 120 are sequentially referred to as a first electrode row RE1c, a second electrode row RE2c, and a third electrode row RE3c along the direction of the arrow in the second direction Y.

The first touch electrode unit 120 may include a first connection portion 123 that electrically connects a plurality of first touch electrodes 121 arranged along the first direction X and a plurality of first touch electrodes 121 adjacent to each other along the first direction X. In the following description of the embodiments, the term "connection" may mean "connection" in terms of physical and/or electrical aspects.

According to some example embodiments, the first touch electrode 121 may have a rhombus shape or a square shape, but the shape thereof is not limited thereto. The first touch electrode 121 may have various shapes such as a triangle, a square other than a rhombus, a rectangle other than a square, a pentagon, a circle, and a bar shape.

The first touch electrode 121 may include a conductive material. The first touch electrode 121 may be formed of the second conductive layer ML2 described above with reference to FIG. 5. Specific examples of the conductive material will be omitted because they are the same as those described above in the description of the second conductive layer ML2.

Because the first touch electrode 121 is formed of the second conductive layer ML2, the first touch electrode 121 may be located on the insulating layer IL as shown in FIG. 17. According to some example embodiments, the first connection portion 123 may be located on the same layer as the first touch electrode 121.

According to some example embodiments, the first touch electrode 121 may be formed in a mesh structure in order to prevent a user from being viewed. When the first touch electrode 121 is formed in a mesh structure, the first touch electrode 121 may be arranged to not overlap the light emitting area of the display panel. In other words, the first touch electrode 121 having a mesh structure may be arranged to overlap the non-light emitting area of the display panel.

The first touch electrodes 121 of the first touch electrode unit 120, spaced apart from each other along the second direction Y, may form columns. For convenience of description, the columns of the first touch electrode unit 120 are sequentially referred to as a first column CE1c, a second column CE2c, and a third column CE3C along the first direction X.

The first touch electrode 121 may include a first opening OP1. For example, each of the first touch electrodes 121 may have at least a central portion open to expose a layer located under the first touch electrode 121. Illustratively, as shown in FIG. 17, the first opening OP1 may expose the insulating layer IL located under the first touch electrode 121.

The first connection portion 123 may electrically connect the first touch electrodes 121 neighboring along the first direction X to each other, and may contact the first touch electrode 121.

According to some example embodiments, the first connection portion 123 may be located on the same layer as the first touch electrode 121. According to some example embodiments, the first connection portion 123 may be formed of the second conductive layer ML2 described above with reference to FIG. 5, and may be formed of the same material as the first touch electrode 121.

Because the first connection portion 123 is formed of the second conductive layer ML2, the first connection portion 123 may be located on the insulating layer IL, as shown in FIGS. 16 and 17.

The number of the first connection portions 123 may be variously changed. For example, two or more first connection portions 123 may be arranged between the two first touch electrodes neighboring along the first direction X.

As shown in FIG. 11, the second touch electrode units 130 may extend along the second direction Y and may be spaced apart from each other along the first direction X. The plurality of second touch electrode units 130 may be spaced apart from each other along the first direction X. Each of the plurality of second touch electrode units 130 may constitute a column. For convenience of description, the columns of the second touch electrode unit 130 are sequentially referred to as a first column CO1c, a second column CO2c, and a third column CO3c along the first direction X.

The second touch electrode unit 130 may be located in the second sensing area SA2 and the third sensing area SA3 as well as the first sensing area SA1.

The second touch electrode unit 130 may include a second connection portion 133 that electrically connects a plurality of second touch electrodes 131 arranged in the second direction Y to a plurality of second touch electrodes 131 neighboring in the second direction Y. According to some example embodiments, the second connection portion 133 may be formed of at least one bridge type connection pattern. According to some example embodiments, the second connection portion 133 may include two or more connection portions (133a and 133b in FIG. 17).

The plurality of second touch electrodes 131 may be electrically connected to each other along the second direction Y. Further, the second touch electrodes 131 may be spaced apart from each other along the first direction X.

The second touch electrodes 131 of the second touch electrode unit 130, spaced along the first direction X, may form rows. For convenience of description, the rows of the second touch electrodes 131 are sequentially referred to as a first row RO1c, a second row RO2c, and a third row RO3c along the direction of the arrow in the second direction Y.

According to some example embodiments, the row formed by the second touch electrodes 131 may be located between the two electrode rows formed by the first touch electrode unit 120. Illustratively, the second row RO2c may be located between the first electrode row RE1c and the second electrode row RE2c, and the third row RO3c may be the second electrode row RE2c and the third electrode row RE3c. That is, the rows formed by the second touch electrodes 131 and the electrode rows formed by the first touch electrode unit 120 may be repeatedly arranged along the second direction Y.

The second touch electrode 131 may include a second opening OP2. For example, each of the second touch electrodes 131 may have at least a central portion open to expose a layer located under the second touch electrode 131. Illustratively, as shown in FIG. 16, the second opening OP2 may expose the insulating layer IL located under the second touch electrode 131.

According to some example embodiments, the area of the second opening OP2 may be different from the area of the first opening OP1. Illustratively, the area of the second opening OP2 may be larger than the area of the first opening OP1.

According to some example embodiments, the planar shape of the second touch electrode 131 may be a rhombus shape, but embodiments are not limited thereto. The second touch electrode 131 may have various shapes such as a triangle, a square other than a rhombus, a rectangle other than a square, a pentagon, a circle, and a bar shape.

The second touch electrode 131 may include a conductive material. The second touch electrode 131 may be formed of the second conductive layer ML2 described above with reference to FIG. 5. According to some example embodiments, the second touch electrode 131 may have a mesh structure, like the first touch electrode 121.

As shown in FIGS. 1, 2 and 11, the pressure sensor 150 may include a first pressure sensor PS1 and a second pressure sensor PS2. Here, the first pressure sensor PS1 and the second pressure sensor PS2 may be located in the first sensing area SA1.

Figure 23:
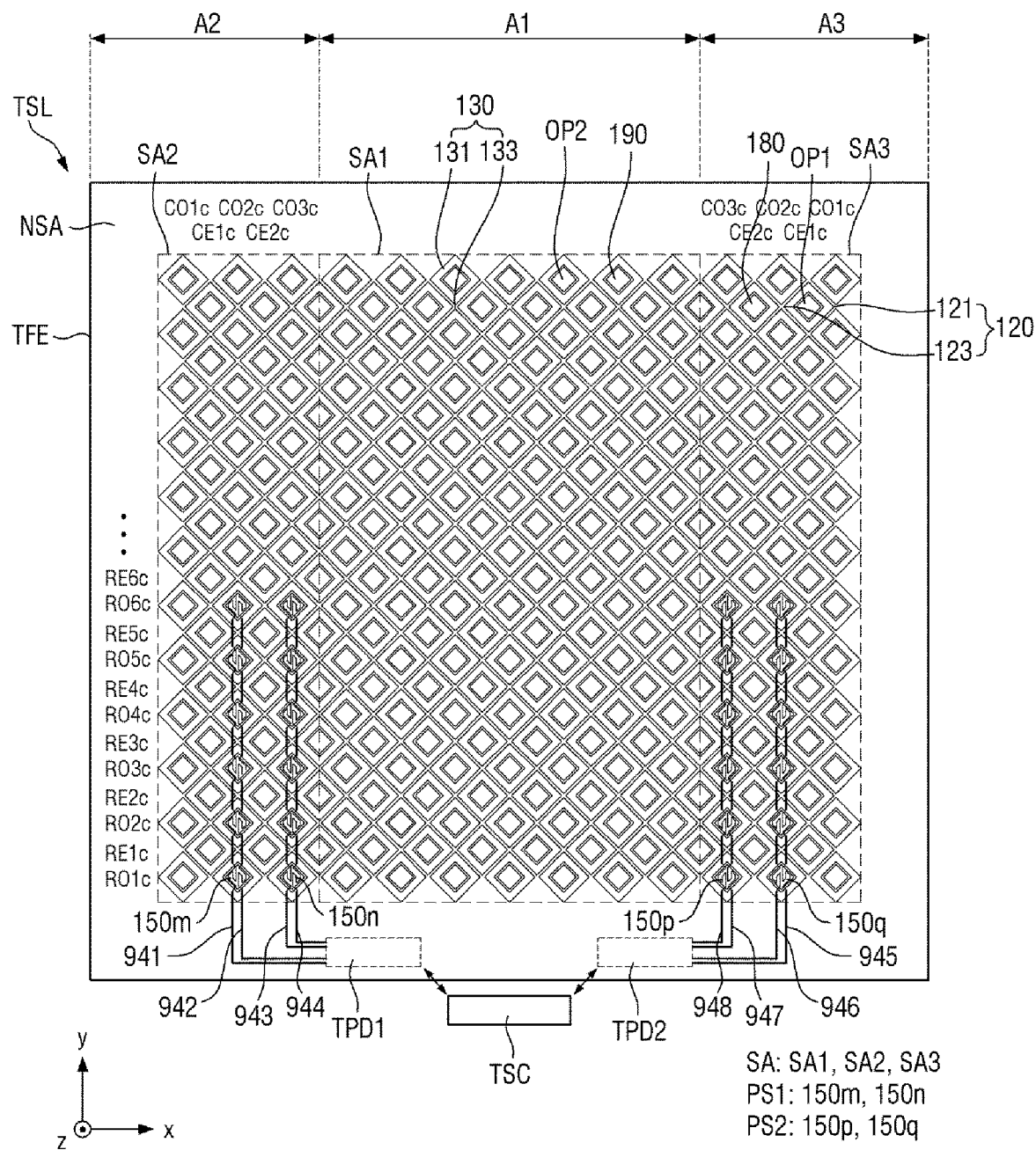
FIG. 23 is a view showing a touch sensor according to some example embodiments, in which a planar structure of an unfolded touch sensor layer and a connection relationship between a touch sensor layer and a touch controller are shown.
Figure 24:
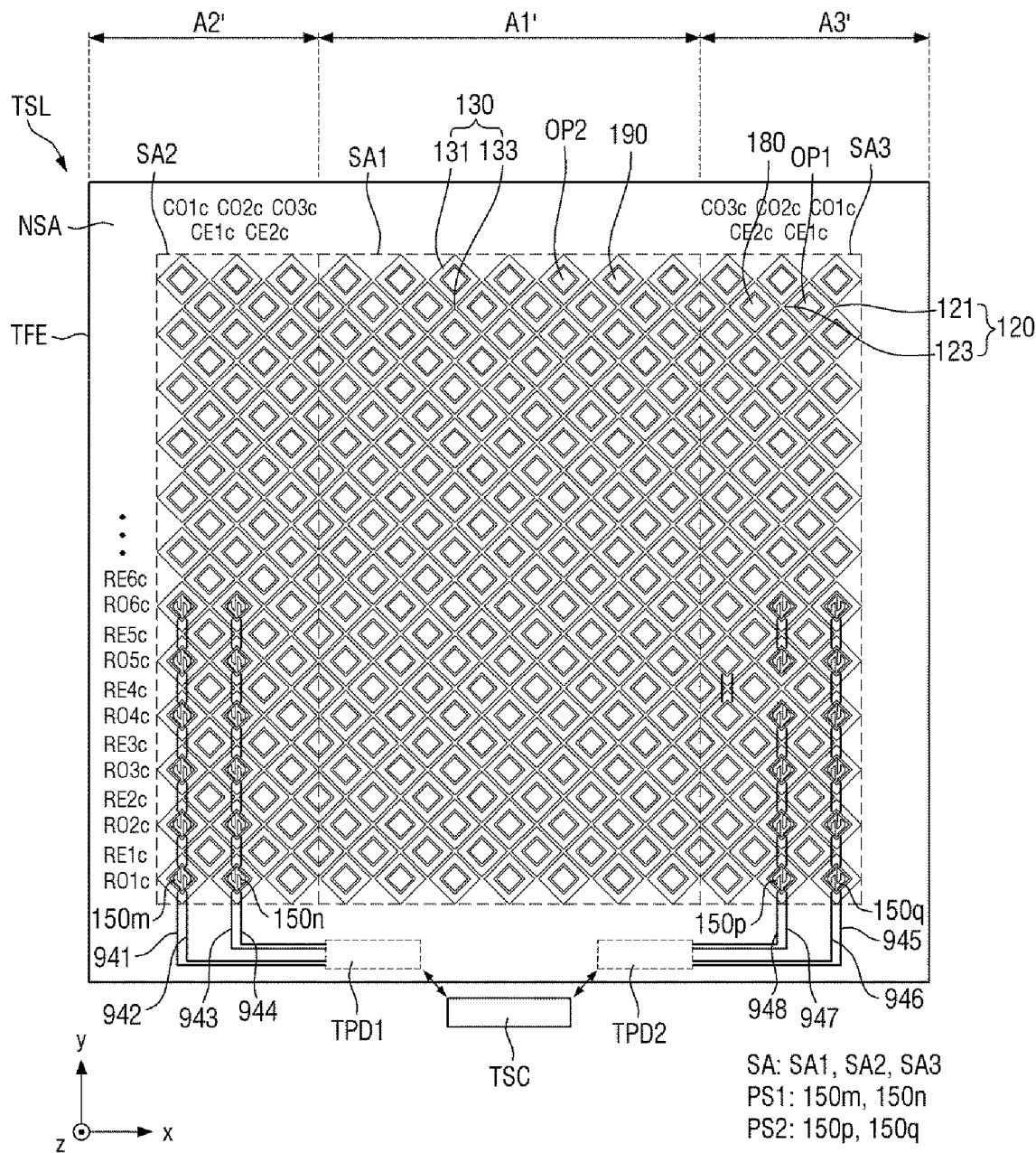
FIG. 24 is a view showing a touch sensor according to some example embodiments, in which a planar structure of an unfolded touch sensor layer and a connection relationship between a touch sensor layer and a touch controller are shown.

According to some example embodiments, as shown in FIG. 23 or 24, the first pressure sensor PS1 and the second pressure sensor PS2 may be located in the second sensing area SA2 and the third sensing area SA3, respectively.

The first pressure sensor PS1 may include a first strain gauge 150m. The first pressure sensor PS1 may further include a second strain gauge 150n.

The first strain gauge 150m and/or the second strain gauge 150n may be located in the second direction Y. According to some example embodiments, each of the first strain gauge 150m and the second strain gauge 150n may be located in a column formed by the second touch electrode 131. Here, the column formed by the second touch electrode 131 may be a column adjacent to an edge where a long side of the first sensing area SA1 the second direction Y is located. Alternatively, as shown in FIGS. 23 and 24 to be described in more detail later, the column formed by the second touch electrode 131 may be a column adjacent to an edge where a long side of the second sensing area SA2 or the third sensing area SA3 in the second direction Y is located. Illustratively, as shown in FIG. 11, the first strain gauge 150m may be located in the first column CO1c, and the second strain gauge 150n may be located in the second column CO2c. That is, in the pressure sensor according to some example embodiments, the strain gauge is located in the second direction Y, the sensing sensitivity to pressure applied to the display device 1 in the first direction X may be improved.

As shown in FIGS. 12 to 15, the first strain gauge 150m may include a first resistance line 151m, a second resistance line 153m, a first connection line 155m, a second connection line 157m, and a first connection pattern 159m.

The first resistance line 151m and the second resistance line 153m may be located in the second opening OP2 formed in the second touch electrode 131 in the first column CO1c, and may be spaced apart from the second touch electrode 131. Further, the first resistance line 151m and the second resistance line 153m may be spaced apart from each other in the second opening OP2. According to some example embodiments, the first resistance line 151m and the second resistance line 153m may not overlap each other on a plane.

The first resistance line 151m and the second resistance line 153m may be formed in a curved shape to have a pattern (e.g., a set or predetermined pattern). When a pressure having an intensity (e.g., a set or predetermined intensity) is applied to the touch sensor layer TSL of the touch sensor TSM, at least one of the length of the first resistance line 151m and the length of the second resistance line 153m is changed. Thus, the resistance value of the first strain gauge 150a is changed, and the pressure detector 250 may sense the changed resistance value to determine the intensity of touch pressure.

According to some example embodiments, the first resistance line 151m and the second resistance line 153m may be formed in a shape including two or more bent portions as shown in FIG. 13. For example, the first resistance line 151m or the second resistance line 153m may include a zigzag pattern reciprocating along the second direction Y or a direction opposite to the second direction Y.

In addition, the shape of the first resistance wire 151m and the shape of the second resistance wire 153m may be variously changed.

Illustratively, when the first touch electrode 121 and the second touch electrode 131 are formed to have a mesh structure, the first resistance line 151m and the second resistance line 153m may be formed by removing a part of the mesh structure.

According to some example embodiments, the first resistance line 151m and the second resistance line 153m may be located on the same layer as the first touch electrode 121 and the second touch electrode 131. Illustratively, when the first touch electrode 121 and the second touch electrode 131 are located on the insulating layer IL, as shown in FIGS. 16 and 17, the first resistance line 151m and the second resistance line 153m may also be located on the insulating layer IL.

The first resistance line 151m and the second resistance line 153m may include a conductive material. According to some example embodiments, the first resistance line 151m may be formed of the same material as the first touch electrode 121 and/or the second touch electrode 131, and may be formed of the second conductive layer ML2 described above with reference to FIG. 5.

The first connection line 155m may electrically connect the first resistance lines 151m neighboring along the second direction Y to each other, and may contact the first resistance line 151m. The second connection line 157m may electrically connect the second resistance lines 153m neighboring along the second direction Y to each other, and may contact the second resistance line 153m. The first connection line 155m and the second connection line 157m may be spaced apart from the first touch electrode unit 120 and the second touch electrode unit 130 without contacting the first touch electrode unit 120 and the second touch electrode unit 130, and the first connection line 155m and the second connection line 157m may be spaced apart from each other.

According to some example embodiments, the first connection line 155m and the second connection line 157m may be formed of the same material as the second connection portion 133, and may be formed of the first conductive layer ML1 described above with reference to FIG. 5.

According to some example embodiments, the insulating layer IL may be located between the first resistance line 151m and the first connection line 155m and between the second resistance line 153m and the second connection line 157m. Here, the first resistance line 151m and the second resistance line 153m may be located on the insulating layer IL, and the first connection line 155m and the second connection line 157m may be located under the insulation layer IL. For example, as shown in FIG. 16, the second resistance line 153m and the second connection line 157m may be connected to each other and be in direct contact with each other through the second contact hole CN2 formed in the insulating layer IL. The connection and arrangement of the first resistance line 151m and the first connection line 155m may also be conducted in the same manner as the second resistance line 153m and the second connection line 157m.

When viewed from a plane, the first strain gauge 150m may extend from one side of the touch sensor layer TSL to the other side thereof along the second direction Y, and then extend from the other side of the touch sensor layer TSL to one side thereof along a direction opposite to the second direction Y. Thus, both ends of the first strain gauge 150m may be located adjacent to one side of the sensing area SA, for example, may be located adjacent to the lower side of the first sensing area SA1 based on FIG. 11.

The second strain gauge 150n may include a first resistance line 151n, a second resistance line 153n, a first connection line 155n, a second connection line 157n, and a first connection pattern 159n. Because the second strain gauge 150n is substantially the same as or similar to the first strain gauge 150m, a detailed description thereof will be omitted.

Referring to FIGS. 14 to 17, the second connection portion 133, the first connection line 155m, and the second connection line 157m may be connected so as not to overlap each other. Hereinafter, for convenience of description, among the second connection portions 133 located in the same column, the second connection portion 133 located at the right side of FIGS. 14 and 15 is referred to as one second connection portion 133a, and the second connection portion 133 located at the left side of FIGS. 14 and 15 is referred to as the other second connection portion 133b.

According to some example embodiments, as shown in FIGS. 14 to 17, the one second connection portion 133*a* and the other second connection portion 133*b* may be provided between the first connection line 155*m* and the second connection line 157*m*. For example, the first connection line 155*m* and the second connection line 157*m* are spaced apart from the second connection portion 133 by a distance (e.g., a set or predetermined distance) to be configured as a "C" shape to externally surround the second connection portion 133. According to some example embodiments, as shown in FIG. 15, the first connection line 155*m* and the second connection line 157*m* may be provided between the one second connection portion 133*a* and the other second connection portion 133*b*.

The second pressure sensor PS2 may include a third strain gauge 150*p* and a fourth strain gauge 150*q*.

According to some example embodiments, the first strain gauge 150*m* and the second strain gauge 150*n* may be arranged to be symmetrical to the third strain gauge 150*p* and the fourth strain gauge 150*q* along the second direction Y with respect to the imaginary axis passing through the center of the first sensing area SA1. According to some example embodiments, the third strain gauge 150*p* and the fourth strain gauge 150*q* may be located in the columns formed by the second touch electrode 131. Illustratively, as shown in FIG. 11, the third strain gauge 150*p* may be located in the sixth column CO6*c*, and the fourth strain gauge 150*q* may be located in the seventh column CO7*c*.

Because the third strain gauge 150*p* and the fourth strain gauge 150*q* are substantially the same as or similar to the first strain gauge 150*m* and the second strain gauge 150*n*, some detailed descriptions thereof may be omitted.

Referring to FIG. 11, the first pattern 180 may be located in the first opening OP1 of the first touch electrode 121 in which the first pressure sensor PS1 and the second pressure sensor PS2 are not arranged. Further, the second pattern 190 may be located in the second opening OP2 of the second touch electrode 131 in which the first pressure sensor PS1 and the second pressure sensor PS2 are not arranged.

As the first opening OP1 is formed in the first touch electrode 121 and the second opening OP2 is formed in the second touch electrode 131, a difference in reflectance of external light may occur, and thus, pattern unevenness may be visually recognized. The first pattern 180 and the second pattern 190 may reduce the difference in reflectance of external light, thereby lowering the possibility that pattern unevenness is visually recognized from the outside.

According to some example embodiments, the first pattern 180 may have substantially the same shape as the first opening OP1, and the second pattern 190 may have the substantially same shape as the second opening OP2. Illustratively, when the planar shape of the first opening OP1 and the second opening OP2 is a rhombus shape, the first pattern 180 and the second pattern 190 may also be formed in a rhombus shape.

The first pattern 180 may be located in the first opening OP1, and may be spaced apart from the first touch electrode 121. The second pattern 190 may be located in the second opening OP2, and may be spaced apart from the second touch electrode 131. That is, each of the first pattern 180 and the second pattern 190 may be an island-shaped conductive pattern. According to some example embodiments, each of the first pattern 180 and the second pattern 190 may be in a floating state.

The first pattern 180 and the second pattern 190 may be formed of the same layer as the first touch electrode 121 and the second touch electrode 131, and may be formed of the same material. That is, the first pattern 180 and the second pattern 190 may be located on the insulating layer IL. According to some example embodiments, the first pattern 180 and the second pattern 190 may be formed of the second conductive layer (ML2 in FIG. 5).

Hereinafter, the non-sensing area NSA will be described in more detail below.

As shown in FIG. 11, the touch sensor layer TSL may include pressure wirings located in the non-sensing area NSA and located on the base layer TFE. The pressure wirings may be connected to the strain gauges of the pressure sensor.

The pressure wirings include a first pressure wiring 941, a second pressure wiring 942, a third pressure wiring 943, and a fourth pressure wiring 944, which are connected to the first pressure sensor PS1. The pressure wirings include a fifth pressure wiring 945, a sixth pressure wiring 946, a seventh pressure wiring 947 and an eighth pressure wiring 948, which are connected to the second pressure sensor PS2.

The first pressure wiring 941 to the fourth pressure wiring 944 may be connected to the first touch pad unit TPD1. The fifth pressure wiring 945 to the eighth pressure wiring 948 may be connected to the second touch pad unit TPD2. Here, each of the first touch pad unit TPD1 and the second touch pad unit TPD2 may include at least one Wheatstone bridge circuit unit. Hereinafter, connection of the strain gauge, the pressure wirings, and the Wheatstone bridge circuit unit will be described in detail with reference to FIGS. 19 to 22.

The touch pad unit may be located in the non-sensing area NSA. According to some example embodiments, as described above, the touch pad unit may be located on the base substrate of the display panel. However, embodiments according to the present invention are not limited thereto, and according to some example embodiments, the touch pad unit may be located on the base layer TFE.

According to some example embodiments, the touch pad unit may include a first touch pad unit TPD1 and a second touch pad unit TPD2. According to some example embodiments, the first touch pad unit TPD1 and the second touch pad unit TPD2 may be spaced apart from each other along the first direction X. The first touch pad unit TPD1 and the second touch pad unit TPD2 may be connected to the touch controller TSC.

Because the touch sensor TSM according to the above-described embodiment implements a touch electrode unit and a pressure sensor using two conductive layers, a manufacturing process may be relatively simplified and the touch sensor TSM may be implemented in the form of a thin film while having a pressure sensing function.

Hereinafter, a touch position detection operation of the touch controller TSC will be described with reference to FIG. 18.

Figure 18:
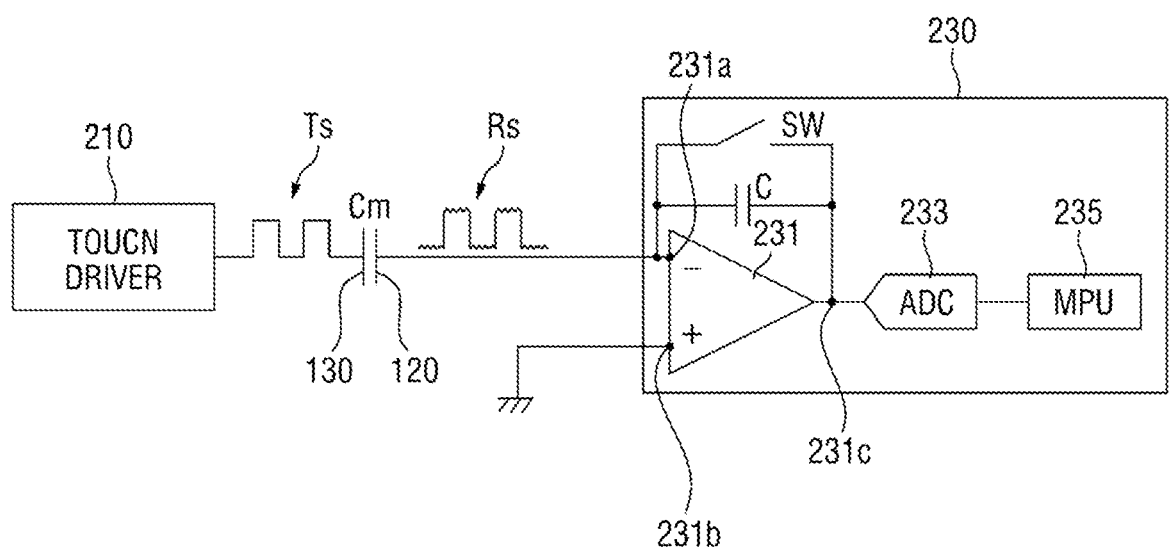
FIG. 18 is a view for explaining a touch position detection operation of a touch sensor according to some example embodiments.

FIG. 18 is a view for explaining a touch position detection operation of a touch sensor according to some example embodiments.

Referring to FIG. 18, the touch driver 210 may provide a driving signal Ts to the second touch electrode unit 130 through a touch wiring. According to some example embodiments, the driving signal Ts may be sequentially provided to the second touch electrode unit 130.

The touch detector 230 may receive a sensing signal Rs from the first touch electrode unit 120 through the touch wiring. According to some example embodiments, as described above, the detection signal Rs may include information about a change in mutual capacitance between the first touch electrode unit 120 and the second touch electrode unit 130. When the driving signal Ts is provided to the second touch electrode unit 130, mutual capacitance Cm is formed between the second touch electrode unit 130 and the first touch electrode unit 120. When a touch input occurs, a change in the mutual capacitance Cm occurs, and the sensing signal Rs may include information about the change in the mutual capacitance described above.

According to some example embodiments, the touch detector 230 may include at least one amplifier 231 such as an operational amplifier (OP amplifier), an analog-to-digital converter 233, and a processor 235.

The amplifier 231 may include a first input terminal 231$a$, a second input terminal 231$b$, and an output terminal 231$c$. According to some example embodiments, the first input terminal 231$a$ of the amplifier 231, such as a inverting input terminal of an OP amplifier, may be electrically connected to the first touch electrode unit 120 through the first touch wiring 901 or the like, and the sensing signal Rs may be input to the first input terminal 231$a$.

According to some example embodiments, a capacitor C and a reset switch SW may be connected in parallel between the first input terminal 231$a$ and the output terminal 231$c$ of the amplifier 231.

Meanwhile, in the above-described embodiment, the amplifier 231 is described as being implemented in the form of a non-inverting amplifier, but embodiments according to the present invention are not limited thereto. According to some example embodiments, the amplifier 231 may be implemented in the form of an inverting amplifier or the like.

The output terminal 231$c$ of the amplifier 231 may be electrically connected to the analog-to-digital converter 233.

The analog-to-digital converter 233 may convert the input analog signal to a digital signal. According to some example embodiments, the analog-to-digital converter 233 may be provided as many as the number of the first touch electrode units 120 so as to be in a correspondence of 1:1 with each of the first touch electrode units 120. Alternatively, according to some example embodiments, the respective first touch electrode units 120 may be configured to share one analog-to-digital converter 233, and in this case, a switching circuit for channel selection may be additionally provided.

The processor 235 processes the signal (digital signal) converted from the analog-to-digital converter 233, and detects a touch input according to the signal processing result. For example, the processor 235 may comprehensively analyze the first sensing signal amplified by the amplifier 231 and converted by the analog-to-digital converter 233 to detect the occurrence of a touch input and the position of the touch input. According to some example embodiments, the processor 235 may be implemented as a microprocessor MPU. In this case, a memory required for driving the processor 235 may be additionally provided inside the touch detector 230. Meanwhile, the configuration of the processor 235 is not limited thereto. As another example, the processor 235 may be implemented as a microcontroller (MCU).

The touch sensor TSM according to the above-described embodiment may effectively cancel a noise signal introduced from the display panel DP or the like, and may improve a signal-to-noise ratio (SNR). Accordingly, malfunction of the touch sensor TSM according to the noise signal may be minimized, and the sensing sensitivity of the touch sensor TSM may be improved.

Hereinafter, a touch pressure detection operation of the touch controller TSC will be described with reference to FIGS. 19 to 22.

Figure 19:
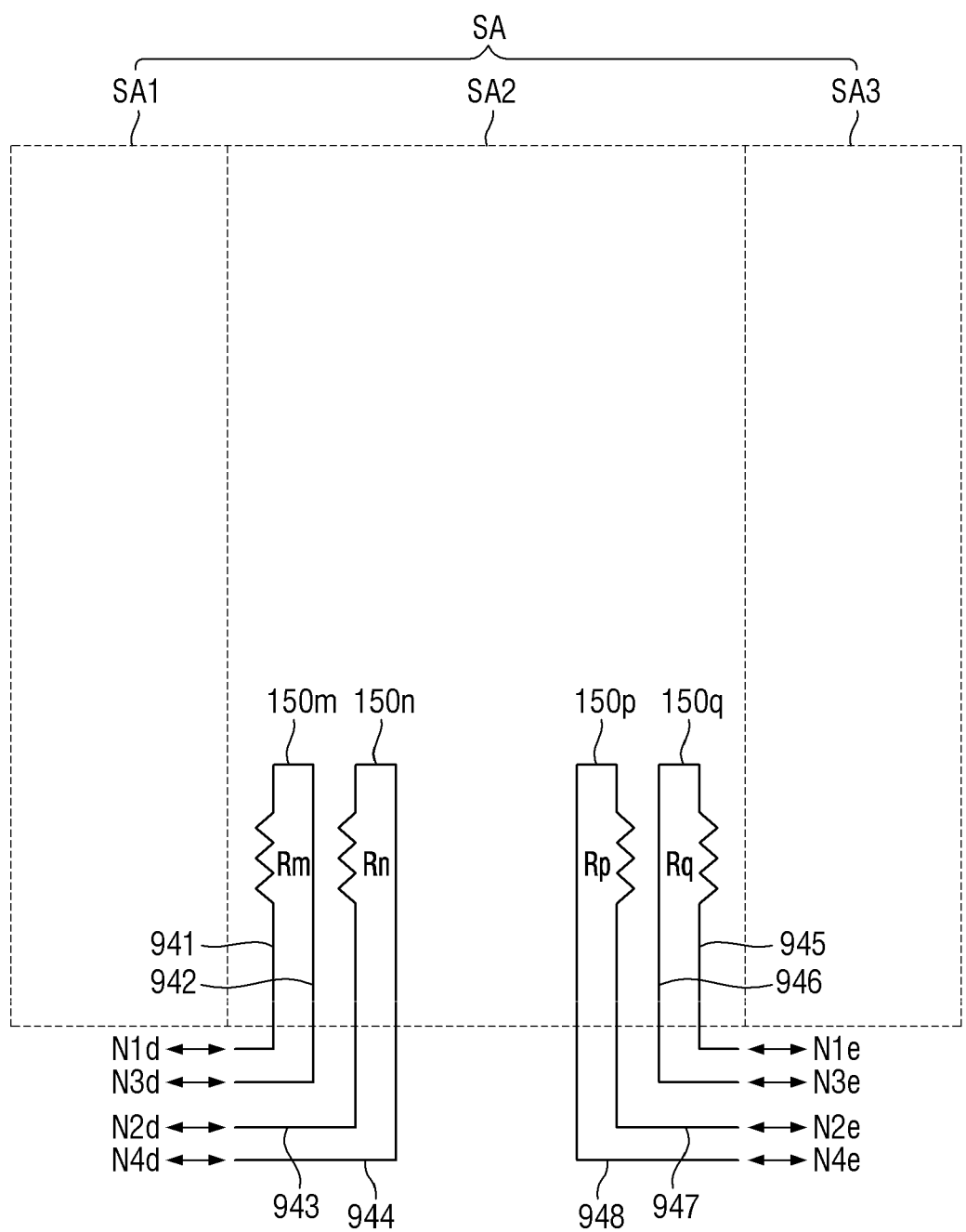
FIG. 19 is a plan view schematically showing a connection relationship among the first pressure sensor, second pressure sensor, pressure wirings and Wheatstone bridge circuit unit shown in FIG. 11.
Figure 20:
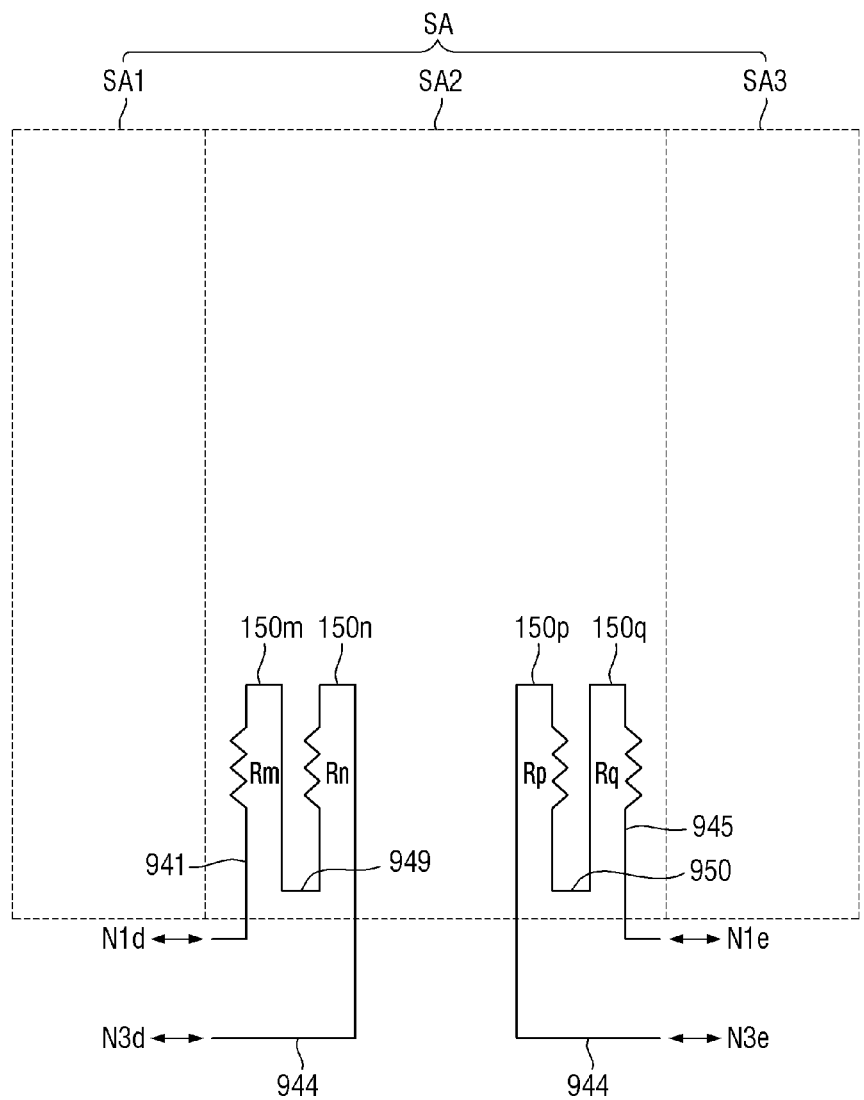
FIG. 20 is a plan view schematically showing a connection relationship among a first pressure sensor, a second pressure sensor, pressure wirings and a Wheatstone bridge circuit unit according to some example embodiments.
Figure 21:
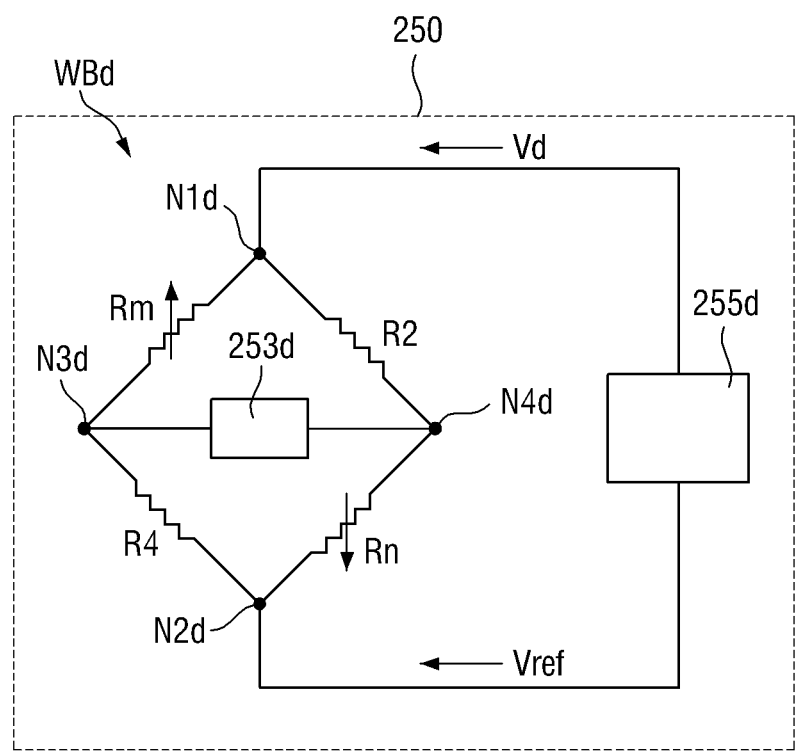
FIG. 21 is a view showing a Wheatstone bridge circuit unit connected to the first pressure sensor shown in FIG. 19.
Figure 22:
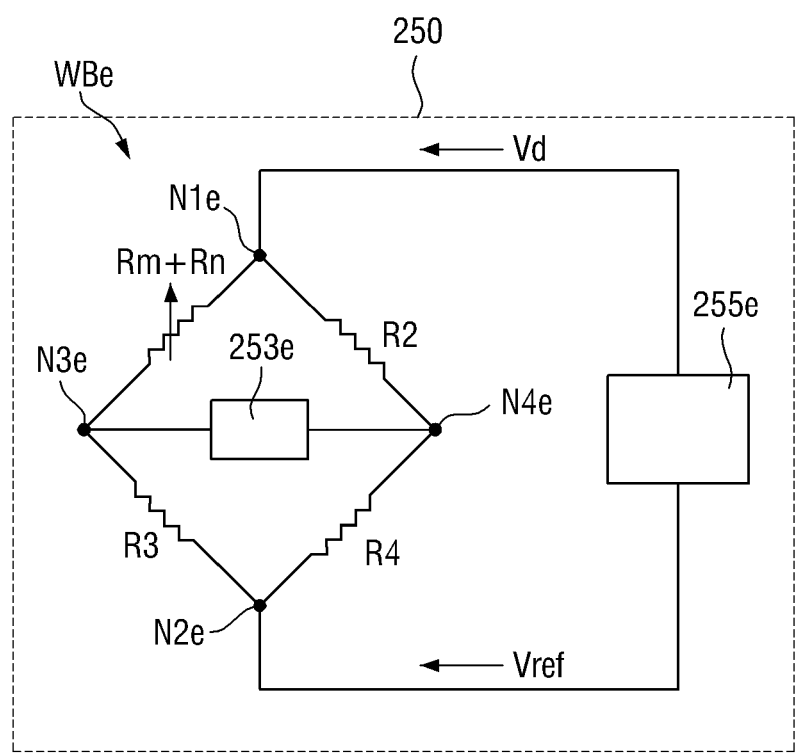
FIG. 22 is a view showing a Wheatstone bridge circuit unit connected to the first pressure sensor shown in FIG. 20.

FIG. 19 is a plan view schematically showing a connection relationship among the first pressure sensor, second pressure sensor, pressure wirings and Wheatstone bridge circuit unit shown in FIG. 11, FIG. 20 is a plan view schematically showing a connection relationship among a first pressure sensor, a second pressure sensor, pressure wirings and a Wheatstone bridge circuit unit according to some example embodiments, FIG. 21 is a view showing a Wheatstone bridge circuit unit connected to the first pressure sensor shown in FIG. 19, and FIG. 22 is a view showing a Wheatstone bridge circuit unit connected to the first pressure sensor shown in FIG. 20.

Referring to FIGS. 19 and 21, in a state where a touch input is not applied, the first strain gauge 150$m$ may have a first resistance value Rm, the second strain gauge 150$n$ may have a second resistance value Rn, the third strain gauge 150$p$ may have a third resistance value Rp, and the fourth strain gauge 150$q$ may have a fourth resistance value Rq.

Because the second pressure sensor PS2 is substantially the same as or similar to the first pressure sensor PS1, hereinafter, a description will be made based on the first strain gauge 150$m$ and the second strain gauge 150$n$ of the first pressure sensor PS1.

The pressure detector 250 may include a first Wheatstone bridge circuit unit WBd.

The first Wheatstone bridge circuit unit WBd may include a first node N1$d$, a second node N2$d$, a first output node N3$d$, and a second output node N4$d$. The first Wheatstone bridge circuit unit WBd may further include a first element 253$d$ connected to the first output node N3$d$ and a second element 255$d$ connected to the first node N1$d$ and the second node N2$d$.

According to some example embodiments, a driving voltage Vd may be provided to the first node N1$d$, and a reference voltage Vref may be provided to the second node N2$d$. Illustratively, the reference voltage Vref may be a ground voltage.

The first element 253$d$ may sense an electrical flow between the first output node N3$d$ and the second output node N4$d$. For example, the first element 253$d$ may be a galvanic element or a voltage measuring element.

The second element 255$d$ may be a voltage supply element that supplies voltages to the first node N1$d$ and the second node N2$d$. According to some example embodiments, the second element 255$d$ may provide a driving voltage Vd to the first node N1$d$ and a reference voltage Vref to the second node N2.

The first pressure sensor PS1 may be electrically connected to the first Wheatstone bridge circuit unit WBd. For example, according to some example embodiments, one end of the first strain gauge 150$m$ may be connected to the first node N1$d$ of the first Wheatstone bridge circuit unit WBd through the first pressure wiring 941, and the other end of the first strain gauge 150$m$ may be connected to the first output node N3$d$ of the first Wheatstone bridge circuit unit WBd through the second pressure wiring 942. One end of the second strain gauge 150$n$ may be connected to the second node N2$d$ of the first Wheatstone bridge circuit unit WBd through the third pressure wiring 943, and the other end of the second strain gauge 150$n$ may be connected to the second output node N4$d$ of the first Wheatstone bridge circuit unit WBd through the fourth pressure wiring 944. Other resistors R2 and R4 of the first Wheatstone bridge circuit unit WBd may have fixed values. Therefore, when a touch input is applied to the touch sensor layer TSL, the first resistance value Rm and the second resistance value Rn may be changed together to enable more sensitive sensing.

According to some example embodiments, in a state where a touch input is not applied or a state where an external force is not applied, the first resistance value Rm of the first strain gauge 150$m$, the second resistance value Rn of the second strain gauge 150$n$, and the values of the remaining resistors R2 and R4 may be substantially the same as each other.

In a state where a touch input is not applied to the touch sensor layer TSL, the first resistance value Rm of the first strain gauge 150$m$, the second resistance value Rn of the second strain gauge 150$n$, and the values of the remaining resistors R2 and R4 may maintain an equilibrium state. For example, a value obtained by multiplying the first resistance value Rm of the first strain gauge 150$m$ and the second resistance value Rn of the second strain gauge 150$n$ may be substantially the same as a value obtained by multiplying the values of the remaining resistors R2 and R4. That is, in the state where a touch input is not applied to the touch sensor layer TSL, the voltages of the first output node N3$d$ and the second output node N4$d$ may be the same as each other.

When a touch input is applied to the touch sensor layer TSL, the shape of at least one of the first strain gauge 150$m$ and the second strain gauge 150$n$ may be deformed by applied pressure, and at least one of the first resistance value Rm of the first strain gauge 150$m$ and the second resistance value Rn of the second strain gauge 150$n$ may be changed by the shape deformation. Accordingly, a voltage difference occurs between the first output node N3$d$ and the second output node N4$d$. The intensity of the touch or the pressure of the touch may be detected by measuring the voltage difference or the amount of current generated by the voltage difference using the first element 253$d$.

Because the connection relationship between the second pressure sensor PS2 including the third strain gauge 150$p$ and the fourth strain gauge 150$q$ and another Wheatstone bridge circuit unit corresponding to the second pressure sensor PS2 may be substantially the same as or similar to the connection relationship between the first pressure sensor PS1 and the first Wheatstone bridge circuit unit WBd, a detailed description of some aspects thereof may be omitted.

Referring to FIGS. 20 and 22, unlike the embodiment of FIGS. 19 and 21, the first strain gauge 150$m$ may be connected to the second strain gauge 150$n$. For example, one end of the first strain gauge 150$m$ may be connected to the first node N1$e$ of the second Wheatstone bridge circuit unit WBe through the first pressure wiring 941, and the other end of the first strain gauge 150$m$ may be connected to one end of the second strain gauge 150$n$ through the eighth pressure wiring 949. The other end of the second strain gauge 150$n$ may be connected to the first output node N3$e$ of the second Wheatstone bridge circuit unit WBe through the fourth pressure wiring 944.

That is, in a state where a touch input is not applied, the value of the resistance connected between the first node N1$e$ and the first output node N3$e$ of the second Wheatstone bridge circuit unit WBe may be equal to the sum (Rm+Rn) of the first resistance value Rm and the second resistance value Rn.

In the state where a touch input is not applied, the sum of the first resistance value Rm and the second resistance value Rn and the values of the remaining resistors R2, R3, and R4 may maintain an equilibrium state. For example, a value obtained by multiplying the sum of the first resistance value Rm and the second resistance value Rn by R3 may be substantially the same as a value obtained by multiplying R2 and R4.

Because the second Wheatstone bridge circuit unit WBe is substantially the same as or similar to the first Wheatstone bridge circuit unit WBd, and a detailed description of some aspects thereof may be omitted.

FIG. 23 is a view showing a touch sensor according to some example embodiments, in which a planar structure of an unfolded touch sensor layer and a connection relationship between a touch sensor layer and a touch controller are shown, and FIG. 24 is a view showing a touch sensor according to some example embodiments, in which a planar structure of an unfolded touch sensor layer and a connection relationship between a touch sensor layer and a touch controller are shown.

Referring to FIGS. 1, 2, 23, and 24, according to some example embodiments, as shown in FIGS. 23 and 24, the first pressure sensor PS1 and the second pressure sensor PS2 may be located in the second area A2 and the third area A3, respectively, and may be located in the display area IDA among the second area A2 and the third area A3.

Referring to FIG. 23, unlike in the case of FIG. 11, at least one of the first pressure sensor PS1 and the second pressure sensor PS2 may be provided on a side surface of the display device 1. Here, the side surface may be a surface forming an angle (e.g., a set or predetermined angle) with respect to a surface forming the upper surface of the display device 1. For example, the first pressure sensor PS1 may be located in the second sensing area SA2, and the second pressure sensor PS2 may be located in the third sensing area SA3.

The first pressure sensor PS1 may include at least one of the first strain gauge 150$m$ and the second strain gauge 150$n$, and the second pressure sensor PS2 may include at least one of the third strain gauge 150$p$ and the fourth strain gauge 150$q$.

As described above, the first pressure sensor PS1 and the second pressure sensor PS2 may be provided along the second direction Y. For example, at least one of the first to fourth strain gauges 150$m$, 150$n$, 150$p$, and 150$q$ may be provided along the long side of the second direction y defining the first to third sensing areas SA1, SA2, and SA3. For example, at least one of the first to fourth strain gauges 150$m$, 150$n$, 150$p$, and 150$q$ may be located adjacent to an edge forming a boundary between the first sensing area SA1 and the second sensing area SA2 or an edge forming a boundary between the first sensing area SA1 and the third sensing area SA3. According to some example embodiments, at least one of the first to fourth strain gauges 150$m$, 150$n$, 150$p$, and 150$q$ may be located adjacent to the long side of the second sensing area SA2 or the third sensing area SA3, forming a boundary of the sensing area SA, in the second direction Y. Referring to FIG. 24, at least one of the first pressure sensor PS1 and the second pressure sensor PS2 may be provided on a flat portion of the display device 1. Here, the flat portion may be the first sensing area SA1 to the third sensing area SA3. That is, the first areas A1' to the third areas A3' shown in FIG. 2 correspond to the first sensing area SA1 to the third sensing area SA3, respectively. The first sensing area SA1 to the third sensing area SA3 may form the same plane.

According to some example embodiments, the first pressure sensor PS1 may be provided in at least some of the plurality of rows constituting the second touch electrode unit 130. For example, the first pressure sensor PS1 may be provided in the second sensing area SA2 to be adjacent to the long side of the second sensing area SA2 in the second direction Y. Here, the long side in the second direction Y may be a long side located at the edge of the sensing area or a long side between the second sensing area SA2 and the first sensing area SA1. For example, the first strain gauge 150$m$ and the second strain gauge 150$n$ of the first pressure sensor PS1 may be provided along the second column CO2$a$ and the third column CO3$a$, respectively.

According to some example embodiments, the first pressure sensor PS1 may be provided in at least some of the plurality of columns constituting the second touch electrode unit 130. For example, the first strain gauge 150m of the first pressure sensor PS1 may be provided along the first row RO1a to the sixth row RO6a in the second column CO2a. Because the configuration of the pressure sensor of FIGS. 23 and 24 is substantially the same as or similar to that of FIG. 11, a detailed description of certain aspects thereof may be omitted.

Figure 25:
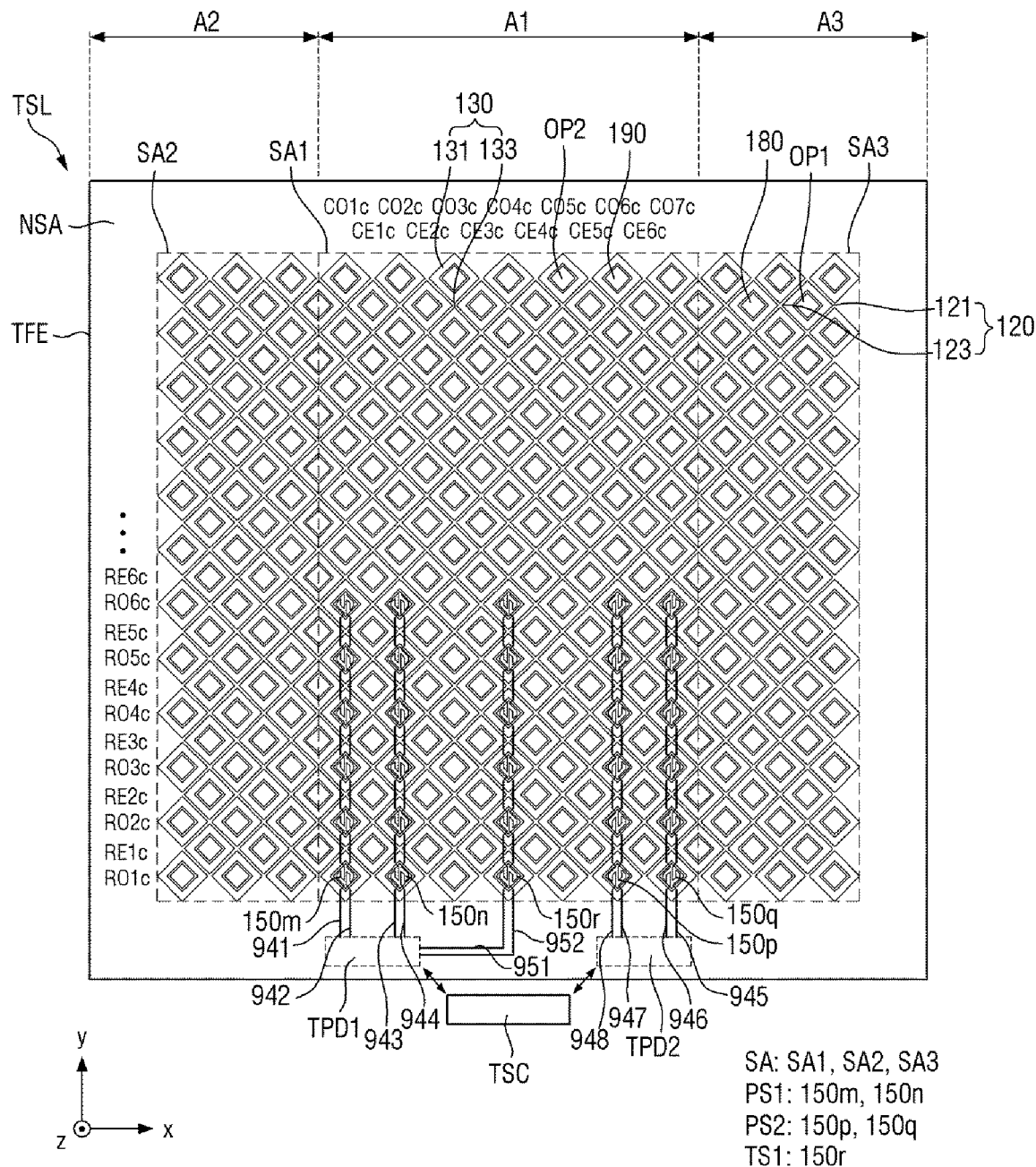
FIG. 25 is a view showing a touch sensor according to some example embodiments, in which a planar structure of an unfolded touch sensor layer and a connection relationship between a touch sensor layer and a touch controller are shown.
Figure 26:
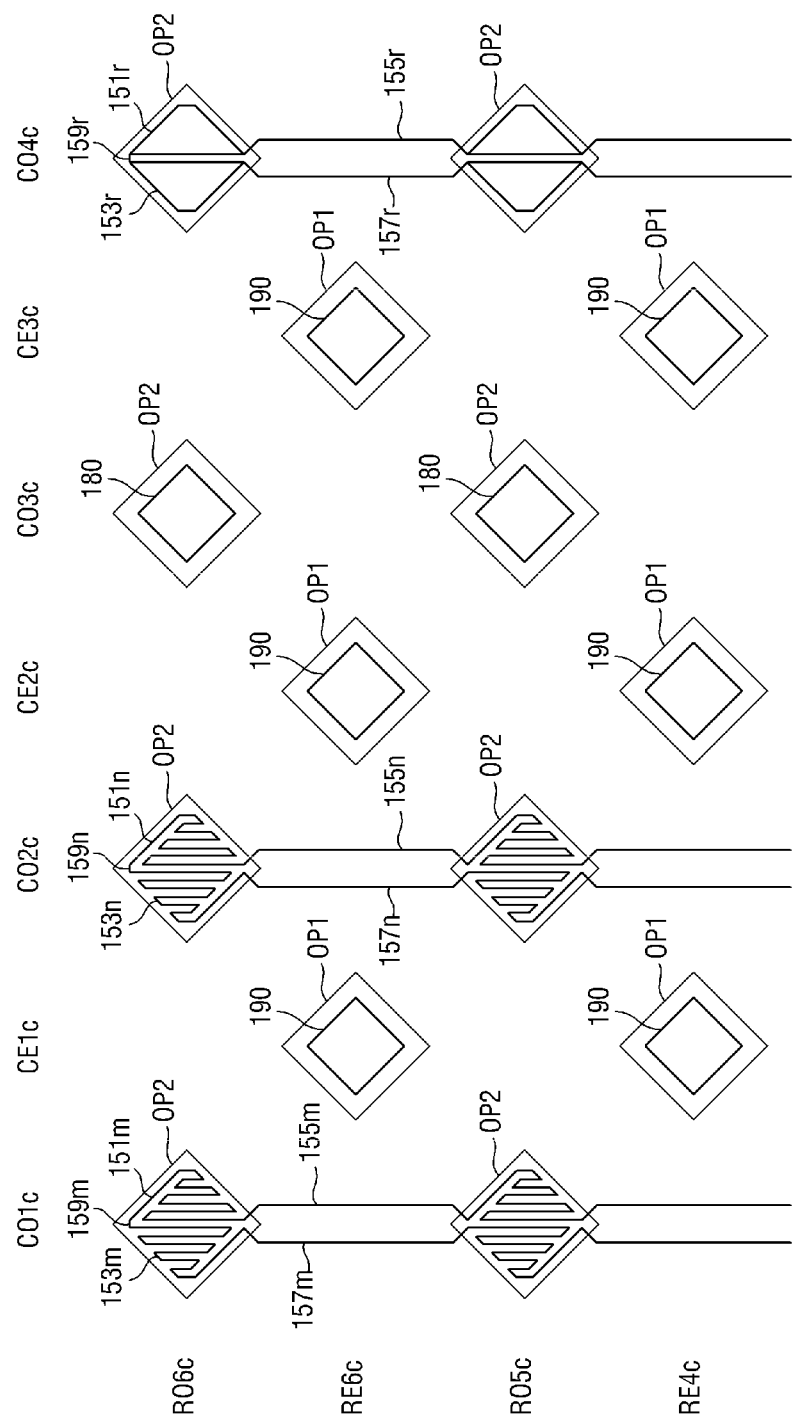
FIG. 26 is a view showing planar structures of the first pressure sensor and pressure sensing pattern shown in FIG. 25.
Figure 27:
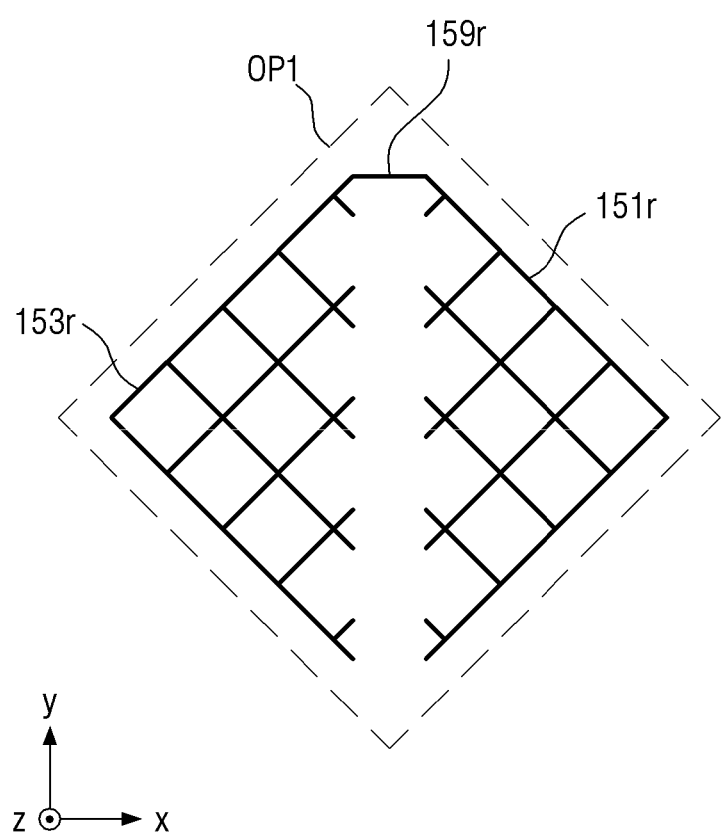
FIG. 27 is an enlarged view of a conductive pattern of the temperature sensing pattern shown in FIGS. 25 and 26.

FIG. 25 is a view showing a touch sensor according to some example embodiments, in which a planar structure of an unfolded touch sensor layer and a connection relationship between a touch sensor layer and a touch controller are shown, FIG. 26 is a view showing planar structures of the first pressure sensor and pressure sensing pattern shown in FIG. 25, and FIG. 27 is an enlarged view of a conductive pattern of the temperature sensing pattern shown in FIGS. 25 and 26.

Referring to FIGS. 25 and 27, the touch sensor may further include at least one temperature sensing pattern TS1 provided along the second direction Y. Here, the temperature sensing pattern TS1 may include a resistance for sensing a temperature change.

According to some example embodiments, the touch sensor may include at least one pressure sensor 150. Here, at least one pressure sensor 150 may be a first pressure sensor PS1 and a second pressure sensor PS2. Various arrangements of the pressure sensor 150 have been described above with reference to FIGS. 1 to 25.

The temperature sensing pattern TS1 may be provided in a column different from the column in which the first pressure sensor PS1 or the second pressure sensor PS2 is provided. Here, at least one column may be located between the column provided with the first pressure sensor PS1 or the second pressure sensor PS2 and the column provided with the temperature sensing pattern TS1. For example, the first pressure sensor PS1 may be provided in the second column CO2c, and the temperature sensing pattern TS1 may be provided in the fourth column CO4c.

According to some example embodiments, the temperature sensing pattern TS1 may be provided in at least some of the plurality of rows constituting the second touch electrode unit 130. Further, the temperature sensing pattern TS1 may be provided in at least some of the plurality of columns constituting the second touch electrode unit 130.

According to some example embodiments, the first pressure sensor PS1 is provided adjacent to an edge of any one of the long sides of the first sensing area SA1 in the second direction Y in the first sensing area SA1, and the temperature sensing pattern TS1 may be provided in the center area of the first sensing area SA1. Here, the center area may be an area in which a column spaced apart by at least one column from a column provided with the first pressure sensor PS1 is provided. For example, the at least one column may be a third column CO3c.

According to some example embodiments, the temperature sensing pattern TS1 may be provided between the first pressure sensor PS1 and the second pressure sensor PS2. For example, the first pressure sensor PS1 is provided in the first column CO1c and the second column CO2c, the second pressure sensor PS2 may be provided in the sixth column CO6c and the seventh column CO7c, and the temperature sensing pattern TS1 may be provided in the fourth column CO4c.

The temperature sensing pattern TS1 may include a first conductive portion 150r. The temperature resistance component of the strain gauge of the touch sensor may be compensated or canceled by the temperature resistance component of the first conductive portion 150r, thereby improving the sensitivity of pressure detection. The first conductive portion 150r may include a first conductive pattern 151r, a second conductive pattern 153r, a third connection line 155r, a fourth connection line 157r, and a second connection pattern 159r.

The first conductive pattern 151r and the second conductive pattern 153r may be located in the second opening OP2 formed in the second touch electrode 131. According to some example embodiments, as shown in FIG. 26, the first conductive pattern 151r and the second conductive pattern 153r may be spaced apart from the second touch electrode 131, and according to some example embodiments, the first conductive pattern 151r and the second conductive pattern 153r may be spaced apart from each other in the second opening OP2.

The planar shape of the first conductive pattern 151r may be different from the planar shape of the first resistance line 151m, and the planar shape of the second conductive pattern 153r may be different from the planar shape of the second resistance line 153m.

According to some example embodiments, the first conductive pattern 151r and the second conductive pattern 153r may have a pair of mesh structures 152b and 154b as shown in FIG. 27.

According to some example embodiments, when the same pressure is applied, the amount of length change or amount of cross-sectional area change of the first conductive pattern 151r may be smaller than the amount of length change or amount of cross-sectional area change of the first resistance line 151m. That is, with respect to the same pressure, the amount of change in the resistance value of the first conductive pattern 151r may be smaller than the amount of change in the resistance value of the first resistance line 151m. Similarly, with respect to the same pressure, the amount of change in the resistance value of the second conductive pattern 153r may be smaller than the amount of change in the resistance value of the second resistance line 153m.

According to some example embodiments, as shown in FIG. 27, the second connection pattern 159r may be located in the second opening OP2. The second connection pattern 159r may connect the first conductive pattern 152r and the second conductive pattern 154r to each other.

According to some example embodiments, the first conductive pattern 152r, the second conductive pattern 154r, and the second connection pattern 159r may be made of the same material as the first touch electrode 121 and the second touch electrode 131, and may be formed of the second conductive layer (ML2 in FIG. 5).

According to some example embodiments, the third connection line 155r may be made of the same material as the second connection portion 133, and may be formed of the first conductive layer (ML1 in FIG. 5).

When a user's touch input is applied to the first pressure sensor PS1 or the second pressure sensor PS2, at least one of the resistance value of the first strain gauge 150m and the resistance value of the second strain gauge 150n may be changed according to the intensity of the touch input. Further, as a temperature change occurs according to a user's body temperature, at least one of a resistance value of the first strain gauge 150m and a resistance value of the second strain gauge 150n may be changed. That is, when a description is conducted based on the first strain gauge 150m, the amount of change in the resistance value of the first strain gauge 150m may include both a component pressure (hereinafter referred to as 'pressure resistance component') that changes according to the shape deformation due to touch pressure and a component (hereinafter referred to as 'temperature resistance component') that changes based on temperature change. Because the temperature resistance component is independent of the intensity of touch pressure, it may act as noise when detecting pressure. In contrast, according to some example embodiments, the touch sensor further includes a temperature sensing pattern TS1. Accordingly, when a user's touch input occurs in the sensing area, in the first conductive pattern 151r and the second conductive pattern 153r, a change in resistance value (or pressure resistance component) according to the intensity of the touch input does not occur or occurs insignificantly. Further, in the first conductive pattern 151r and the second conductive pattern 153r, a change in resistance value according to the change of temperature occurs. Accordingly, the temperature resistance components of the first strain gauge 150m and the second strain gauge 150n may be compensated or canceled by the temperature resistance component of the first conductive portion 150r, thereby improving pressure detection sensitivity.

Hereinafter, a touch pressure detection operation of the touch controller TSC will be described with reference to FIGS. 28 to 31.

Figure 28:
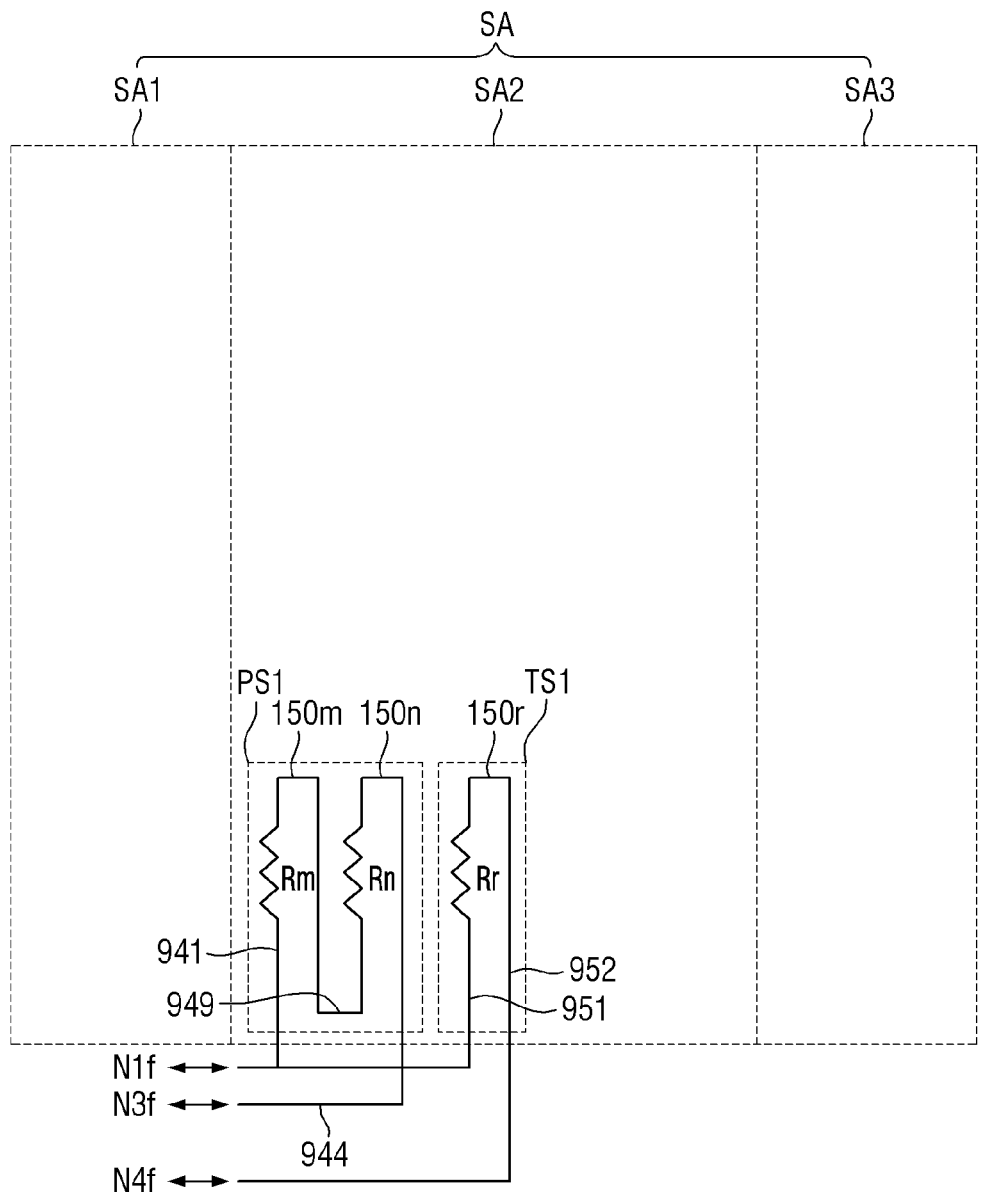
FIG. 28 is a view conceptually showing a connection relationship among the first pressure sensor, temperature sensing pattern, pressure wirings and Wheatstone bridge circuit unit shown in FIG. 25.
Figure 29:
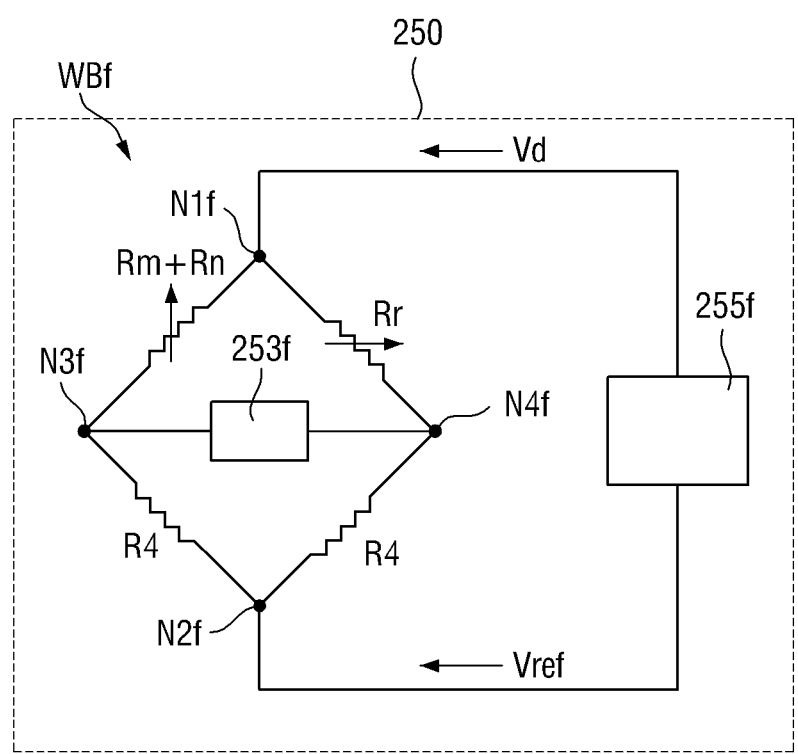
FIG. 29 is a view showing a Wheatstone bridge circuit unit connected to the first pressure sensor of FIG. 28.

FIG. 28 is a view conceptually showing a connection relationship among the first pressure sensor, temperature sensing pattern, pressure wirings and Wheatstone bridge circuit unit shown in FIG. 25, and FIG. 29 is a view showing a Wheatstone bridge circuit unit connected to the first pressure sensor of FIG. 28.

Referring to FIGS. 28 and 29, in a state where a touch input is not applied, the first strain gauge 150m may have a first resistance value Rm, the second strain gauge 150n may have a second resistance value Rn, the third strain gauge 150p may have a third resistance value Rp, and the fourth strain gauge 150q may have a fourth resistance value Rq. Further, the first conductive portion 150r may have a fifth resistance value Rr.

The pressure detector 250 may include a third Wheatstone bridge circuit unit WBf. The third Wheatstone bridge circuit unit WBf may include a first node N1f, a second node N2f, a first output node N3f, and a second output node N4f. The third Wheatstone bridge circuit unit WBf may include a first element 253f connected to the first output node N3f and the second output node N4f, and a second element 255f connected to the first node N1f and the second node N2f.

The first pressure sensor PS1 and the first conductive portion 150r may be electrically connected to the third Wheatstone bridge circuit unit WBf. Hereinafter, a case where the other end of the first strain gauge 150m of the first pressure sensor PS1 and one end of the second strain gauge 150n thereof are connected as shown in FIG. 20 will be mainly described. However, as in the case of FIG. 19, it is needless to say that the first strain gauge 150m and the second strain gauge 150n may be individually connected to the nodes of the Wheatstone bridge circuit unit.

For example, one end of the first strain gauge 150m is connected to the first node N1f of the third Wheatstone bridge circuit unit WBf through the first pressure wiring 941, and the other end of the first strain gauge 150m may be connected to one end of the second strain gauge 150n through the eighth pressure wiring 949. The other end of the second strain gauge 150n may be connected to the first output node N3f of the third Wheatstone bridge circuit unit WBf through the fourth pressure wiring 944. One end of the first conductive portion 150r may be connected to the first node N1f of the third Wheatstone bridge circuit unit WBf through the tenth pressure wiring 951, and the other end of the first conductive portion 150r may be connected to the first output node N3f of the third Wheatstone bridge circuit unit WBf through the eleventh pressure wiring 952.

Therefore, when a touch input is applied to the touch sensor layer TSL, the first resistance value Rm, the second resistance value Rn, and the fifth resistance value Rr are changed together, thereby enabling more sensitive sensing.

Because the connection relationship of the strain gauges, the conductive portion, and the Wheatstone bridge circuit unit, shown in FIGS. 28 and 29, is substantially the same as or similar to that of FIGS. 19 to 22, a detailed description of certain aspects thereof may be omitted.

Figure 30:
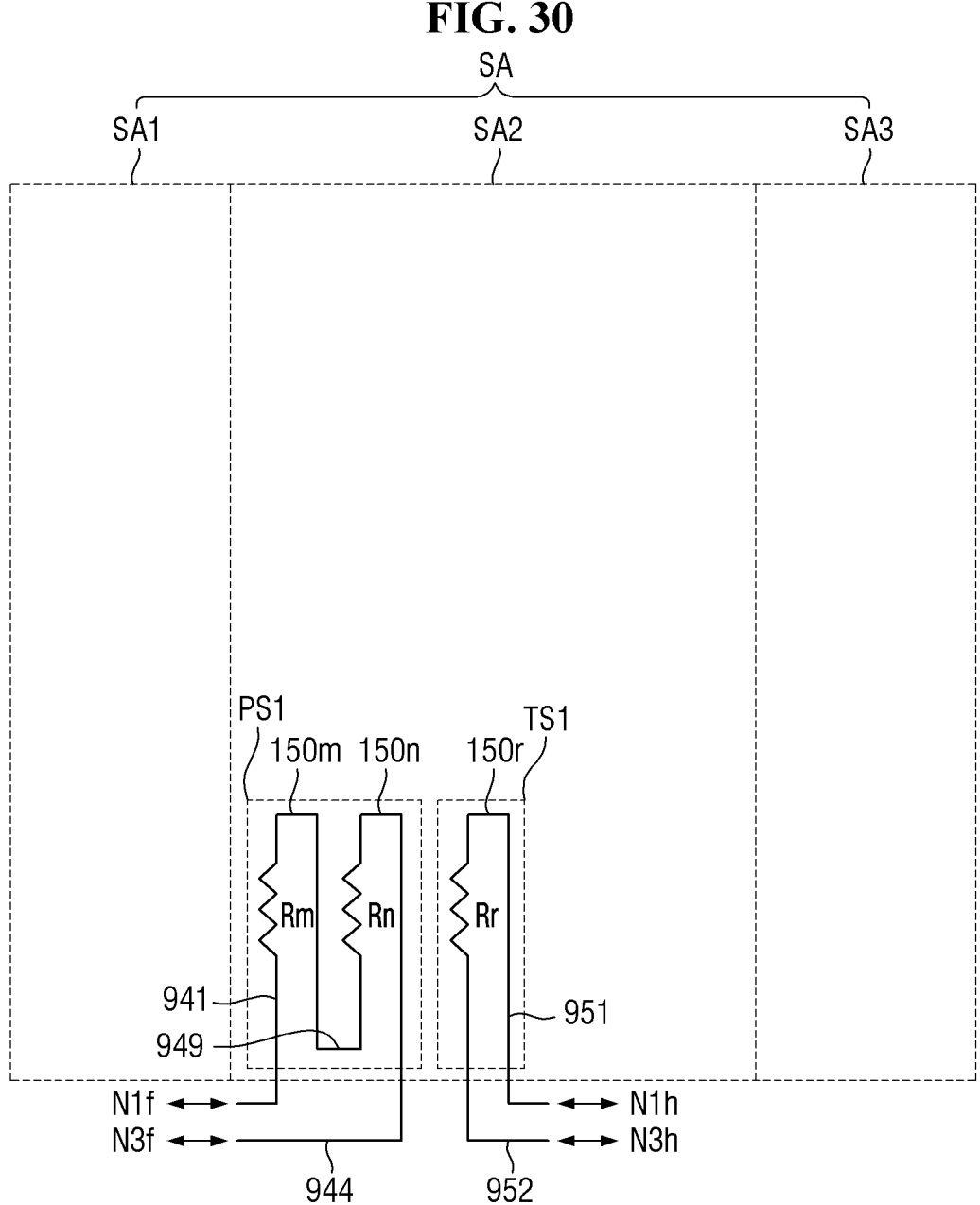
FIG. 30 is a view conceptually showing a connection relationship among a first pressure sensor, a temperature sensing pattern, pressure wirings and a Wheatstone bridge circuit unit according to some example embodiments.
Figure 31:
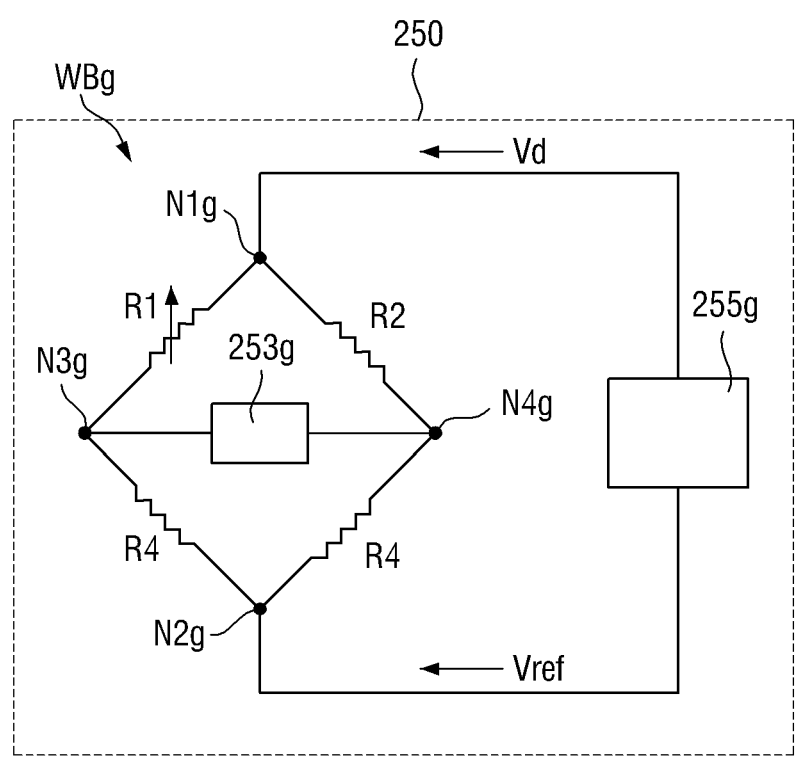
FIG. 31 is a view showing a Wheatstone bridge circuit unit connected to the first pressure sensor of FIG. 30.

FIG. 30 is a view conceptually showing a connection relationship among a first pressure sensor, a temperature sensing pattern, pressure wirings and a Wheatstone bridge circuit unit according to some example embodiments, and FIG. 31 is a view showing a Wheatstone bridge circuit unit connected to the first pressure sensor of FIG. 30.

Referring to FIGS. 30 and 31, unlike the embodiments described with respect to FIGS. 28 and 29, the pressure sensor 150 and the temperature sensing pattern TS1 may be connected to other Wheatstone bridge circuit units. For example, the first pressure sensor PS1 may be connected to a fourth Wheatstone bridge circuit unit WBg, and the temperature sensing pattern TS1 may be connected to a fifth Wheatstone bridge circuit unit. Because the fifth Wheatstone bridge circuit unit has a configuration substantially the same as or similar to that of the fourth Wheatstone bridge circuit unit WBg, hereinafter, a detailed description of certain aspects thereof may be omitted, and the fifth Wheatstone bridge circuit unit is not separately shown.

In a state where a touch input is not applied, the first strain gauge 150m may have a first resistance value Rm, the second strain gauge 150n may have a second resistance value Rn, the third strain gauge 150p may have a third resistance value Rp, and the fourth strain gauge 150q may have a fourth resistance value Rq. The first conductive portion 150r may have a fifth resistance value Rr.

The pressure detector 250 may include a fourth Wheatstone bridge circuit unit WBg and a fifth Wheatstone bridge circuit unit. The fourth Wheatstone bridge circuit unit WBg may include a first node N1g, a second node N2g, a first output node N3g, and a second output node N4g. The fourth Wheatstone bridge circuit unit WBg may further include a first element 253g connected to the first output node N3g and the second output node N4g, and a second element 255g connected to the first node N1g and the second node N2g.

The first pressure sensor PS1 may be electrically connected to the fourth Wheatstone bridge circuit unit WBg, and the first conductive portion 150r may be electrically connected to an eighth Wheatstone bridge circuit unit.

For example, one end of the first strain gauge 150m may be connected to the first node N1g of the fourth Wheatstone bridge circuit unit WBg through the first pressure wiring 941, and the other end of the first strain gauge 150m may be connected to one end of the second strain gauge 150n through the eighth pressure wiring 949. The other end of the second strain gauge 150n may be connected to the first output node N3g of the fourth Wheatstone bridge circuit unit WBg through the fourth pressure wiring 944. One end of the first conductive portion 150r may be connected to the first node of the eighth Wheatstone bridge circuit unit through the tenth pressure wiring 951, and the other end of the first conductive portion 150r may be connected to the first output node of the eighth Wheatstone bridge circuit portion through the eleventh pressure wiring 952.

Accordingly, the resistance value R1 connected between the first node N1g and the first output node N3g of the fourth Wheatstone bridge circuit unit WBg may be equal to the sum (Rm+Rn) of the first resistance value Rm and the second resistance value Rn. Further, the resistance value R1 connected between the first node and the first output node of the eighth Wheatstone bridge circuit unit connected to the first conductive portion 150r may be equal to the fifth resistance value Rr.

Because the connection relationship of the strain gauges, the conductive portion, and the Wheatstone bridge circuit unit, shown in FIGS. 30 and 31, is substantially the same as or similar to that of FIGS. 19 to 22, a detailed description of certain aspects thereof may be omitted.

In the touch sensor according to the above-described embodiments and the display device including the same, because the pressure sensor is located in the touch sensor, it may be possible to detect the intensity of pressure even without a separate pressure sensor. Further, because pressure sensors may be formed together in the process of forming the touch electrode unit, the manufacturing process may be relatively simplified without increasing the thickness of the touch sensor. Moreover, because pressure sensors may replace physical input buttons or may be used in combination with the physical input buttons, there is an ability to provide various user interfaces to users.

Further, because the touch sensor may cancel noise introduced from the display panel or the like, touch sensitivity may be relatively improved.

Moreover, according to some example embodiments, because pressure sensors included in the touch sensor may compensate for resistance changes due to temperature, the detection sensitivity of touch pressure may be relatively improved.

According to some example embodiments of the present invention, it is possible to provide a touch sensor capable of sensing not only the position of a touch input but also the pressure of a touch input and to provide a display device including the same.

The characteristics of embodiments according to the present invention are not limited by the foregoing, and other various other characteristics are anticipated herein.

Although the example embodiments of the present invention have been disclosed for illustrative purposes, those skilled in the art will appreciate that various modifications, additions and substitutions are possible, without departing from the scope and spirit of the invention as disclosed in the accompanying claims and their equivalents.

In concluding the detailed description, those skilled in the art will appreciate that many variations and modifications can be made to the example embodiments without substantially departing from the principles of embodiments according to the present invention. Therefore, the disclosed example embodiments of the invention are used in a generic and descriptive sense only and not for purposes of limitation.

What is claimed is:

1. A display device, comprising:
   a display panel having short sides and long sides; and
   a touch sensor on the display panel and including a sensing area and a non-sensing area around the sensing area,
   wherein the touch sensor includes:
   a first touch electrode unit including a plurality of first touch electrodes in the sensing area, arranged in a first direction in which the short sides of the display panel extend, and each including a first opening;
   a second touch electrode unit including a plurality of second touch electrodes in the sensing area, arranged in a second direction in which the long sides of the display panel extend, and each including a second opening; and
   a pressure sensor including a strain gauge, at least a part of the strain gauge being located in the sensing area,
   wherein the strain gauge includes a plurality of first resistance lines which are electrically connected to each other in the second direction in which the long sides of the display panel extend and a plurality of second resistance lines which are electrically connected to each other in the second direction in which the long sides of the display panel extend,
   wherein one of the plurality of first resistance lines and one of the plurality of second resistance lines are disposed in the second opening of one of the plurality of second touch electrodes, and
   wherein the plurality of first touch electrodes, the plurality of second touch electrodes, the plurality of first resistance lines and the plurality of second resistance lines are disposed direction on a same layer.

2. The device of claim 1,
   wherein the pressure sensor includes a first pressure sensor along a first long side of the sensing area.

3. The device of claim 2,
   wherein the pressure sensor includes a second pressure sensor along a second long side of the sensing area.

4. The device of claim 3,
   wherein a length of the first pressure sensor is different from a length of the second pressure sensor.

5. The device of claim 3,
   wherein the sensing area includes a first sensing area, a second sensing area along the first long side of the first sensing area and bent downward, and a third sensing area at an opposite side of the second sensing area along the second long side of the first sensing area and bent downward; and
   wherein the first pressure sensor is in the second sensing area, and the second pressure sensor is in the third sensing area.

6. The device of claim 1,
   wherein the plurality of second touch electrode units are along the first direction in which the short sides of the display panel extend, the plurality of second touch electrodes define columns along the second direction in which the long sides of the display panel extend, and the strain gauge includes a first strain gauge at a first column among the columns defined by the plurality of second touch electrodes and a second strain gauge at a second column adjacent to the first column.

7. The device of claim 6, further comprising:
   a Wheatstone bridge circuit unit including a first node to which a driving voltage is provided, a second node to which a reference voltage is provided, a first output node to which one end of a voltage measuring element is connected, and a second output node to which the other end of the voltage measuring element is connected; and
   a pressure wiring in the non-sensing area and electrically connecting the first strain gauge and the second strain gauge to the Wheatstone bridge circuit unit.

8. The device of claim 7,
   wherein the pressure wiring includes a first pressure wiring connected to a first end of the first strain gauge, a second pressure wiring connecting a second end of the first strain gauge and a first end of the second strain gauge, and a third pressure wiring connected to a second end of the second strain gauge.

9. The device of claim 8,
wherein the first pressure wiring is connected to the first node, and the second pressure wiring is connected to the first output node.

10. The device of claim 7,
wherein the pressure wiring includes a first pressure wiring connected to a first end of the first strain gauge, a second pressure wiring connected to a second end of the first strain gauge, a third pressure wiring connected to a first end of the second strain gauge, and a fourth pressure wiring connected to a second end of the second strain gauge.

11. The device of claim 10,
wherein the first pressure wiring is connected to the first node, the second pressure wiring is connected to the first output node, the third pressure wiring is connected to the second node, and the fourth pressure wiring is connected to the second output node.

12. The device of claim 1,
wherein the second touch electrode unit includes at least one connection portion electrically connecting the second touch electrodes adjacent to each other along the second direction in which the long sides of the display panel extend; and
the strain gauge further includes a first connection line electrically connecting first resistance lines adjacent to each other along the second direction in which the long sides of the display panel extend, and a second connection line electrically connecting second resistance lines adjacent to each other along the second direction in which the long sides of the display panel extend.

13. The device of claim 12,
wherein the at least one connection portion is between the first connection line and the second connection line.

14. The device of claim 12,
wherein the at least one connection portion includes a pair of connection portions, and the first connection line and the second connection line are located between the pair of connection portions.

15. The device of claim 6,
wherein the touch sensor further includes a temperature sensing pattern located in a column different from the column in which the first strain gauge and the second strain gauge are located.

16. The device of claim 15,
wherein the temperature sensing pattern is spaced from an edge of the sensing area.

17. The device of claim 15,
wherein the touch sensor further includes a pressure wiring located in the non-sensing area, and a Wheatstone bridge circuit unit including a first node to which a driving voltage, a second node to which a reference voltage is provided, a first output node to which one end of a voltage measuring element is connected, and a second output node to which the other end of the voltage measuring element is connected; and
the pressure wiring includes a first pressure wiring connected to one end of the first strain gauge, a second pressure wiring connected to the other end of the first strain gauge, a third pressure wiring connected to one end of the temperature sensing pattern, and a fourth pressure wiring connected to the other end of temperature sensing pattern.

18. The device of claim 17,
wherein the first pressure wiring and the third pressure wiring are connected to the first node, the second pressure wiring is connected to the first output node, and the fourth pressure wiring is connected to the second output node.

19. The device of claim 17,
wherein the Wheatstone bridge circuit unit further includes a first Wheatstone bridge circuit unit connected by the pressure sensor and the pressure wiring and a second Wheatstone bridge circuit unit connected by the temperature sensing pattern and the pressure wiring;
each of the first Wheatstone bridge circuit unit and the second Wheatstone bridge circuit unit includes the first node, the second node, the first output node, and the second output node; and
the first pressure wiring is connected to the first node of the first Wheatstone bridge circuit unit, the second pressure wiring is connected to the first output node of the first Wheatstone bridge circuit unit, the third pressure wiring is connected to the first node of the second Wheatstone bridge circuit unit, and the fourth pressure wiring is connected to the first output node of the second Wheatstone bridge circuit unit.

20. The device of claim 1,
wherein the strain gauge includes a portion formed of the same layer as the first touch electrodes and the second touch electrodes.

21. A display device, comprising:
a display panel including a first display area having short sides and long sides and a second display area along one long side of the first display area and bent downward;
a touch sensor on the display panel and including a sensing area and a non-sensing area around the sensing area,
wherein the touch sensor includes:
a first touch electrode unit including a plurality of first touch electrodes in the sensing area, arranged in a first direction in which the short sides of the display panel extend, and each including a first opening;
a second touch electrode unit including a plurality of second touch electrodes in the sensing area, arranged in a second direction in which the long sides of the display panel extend, and each including a second opening; and
a pressure sensor including a strain gauge, at least a part of the strain gauge being located in the sensing area,
wherein the strain gauge includes a plurality of first resistance lines which are electrically connected to each other in the second direction in which the long sides of the display panel extend and a plurality of second resistance lines which are electrically connected to each other in the second direction in which the long sides of the display panel extend,
wherein one of the plurality of first resistance lines and one of the plurality of second resistance lines are disposed in the second opening of one of the plurality of second touch electrodes, and
wherein the plurality of first touch electrodes, the plurality of second touch electrodes, the plurality of first resistance lines and the plurality of second resistance lines are disposed directly on a same layer.

22. The device of claim 21,
wherein the display panel includes a base substrate and a self-emitting element on the base substrate, the base substrate includes a first inorganic layer covering the self-emitting element, an organic layer located on the first inorganic layer, and a second inorganic layer on the organic layer, and the strain gauge is on the second inorganic layer.

* * * * *